(12) United States Patent
Dimitrov et al.

(10) Patent No.: US 11,700,402 B1
(45) Date of Patent: Jul. 11, 2023

(54) DYNAMICALLY REDUCING STUTTER AND LATENCY IN VIDEO STREAMING APPLICATIONS

(71) Applicant: NVIDIA Corporation, Santa Clara, CA (US)

(72) Inventors: Rouslan Dimitrov, Santa Clara, CA (US); Viktor Grigoryevich Vandanov, San Jose, CA (US); Sau Yan Keith Li, San Jose, CA (US); James Howard, Folsom, CA (US); Scott Phillip Cutler, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/704,732

(22) Filed: Mar. 25, 2022

(51) Int. Cl.
  *H04N 21/238* (2011.01)
  *H04N 21/24* (2011.01)
(52) U.S. Cl.
  CPC ... *H04N 21/23805* (2013.01); *H04N 21/2401* (2013.01)
(58) Field of Classification Search
  CPC .................. H04N 21/23805; H04N 21/2401
  See application file for complete search history.

(56) References Cited

U.S. PATENT DOCUMENTS

| | | | | |
|---|---|---|---|---|
| 5,841,771 A * | 11/1998 | Irwin | ................. | H04Q 11/0478 370/383 |
| 6,357,028 B1 * | 3/2002 | Zhu | .................... | H04N 21/6377 714/751 |
| 6,396,850 B1 * | 5/2002 | de Vito | ................ | H04N 7/1675 348/E7.056 |
| 6,665,345 B1 * | 12/2003 | Sekiguchi | .............. | H04N 19/66 375/E7.279 |
| 6,980,731 B1 * | 12/2005 | Tahara | ............. | H04N 21/43632 386/E9.036 |
| 6,983,323 B2 * | 1/2006 | Cantrell | .................... | H04L 9/40 709/225 |
| 7,617,509 B1 * | 11/2009 | Brunheroto | .......... | H04N 17/004 725/19 |
| 7,760,826 B2 * | 7/2010 | Chang | ............... | H04L 25/03019 375/346 |
| 8,279,884 B1 * | 10/2012 | Narasimha | ............ | H04L 47/283 370/410 |
| 8,284,259 B2 * | 10/2012 | Karacali-Akyamac | ...................... | H04L 43/024 348/180 |

(Continued)

*Primary Examiner* — Michael B. Pierorazio
(74) *Attorney, Agent, or Firm* — Lowenstein Sandler LLP

(57) ABSTRACT

A performance metrics of a receiver is obtained using frames of an application hosted by a server that are received via a network. The one or more performance metrics include information indicative of a current occupancy of a frame buffer corresponding to the receiver and information indicative of a target occupancy of the frame buffer corresponding to the receiver. The frame buffer of the receiver is used to queue frames of the application for display. A frame rate associated with rendering at least one next frame of the application is adjusted using the one or more performance metrics of the receiver to control population of the frame buffer. Subsequent frames of the application hosted by the server are rendered using the adjusted frame rate. Upon rendering the subsequent frames, the server sends the subsequent frames to the receiver for display.

21 Claims, 14 Drawing Sheets

(56) References Cited

U.S. PATENT DOCUMENTS

| | | | |
|---|---|---|---|
| 8,620,275 B2* | 12/2013 | Minear | H04L 67/04 |
| | | | 725/62 |
| 9,203,498 B2* | 12/2015 | Ohayon | H04L 25/02 |
| 10,735,120 B1* | 8/2020 | Kantharaju | H04L 43/087 |
| 2002/0053053 A1* | 5/2002 | Nagai | H04L 1/0002 |
| | | | 375/E7.016 |
| 2002/0196363 A1* | 12/2002 | Furusawa | H04N 21/4344 |
| | | | 348/461 |
| 2003/0051254 A1* | 3/2003 | Weidenfeller | H04N 21/266 |
| | | | 725/98 |
| 2004/0105463 A1* | 6/2004 | Cheung | H04L 67/61 |
| | | | 370/468 |
| 2004/0153940 A1* | 8/2004 | Yu | H04L 1/0051 |
| | | | 714/746 |
| 2005/0100100 A1* | 5/2005 | Unger | H04N 21/6373 |
| | | | 375/E7.134 |
| 2005/0120124 A1* | 6/2005 | Korhonen | H04L 1/18 |
| | | | 714/746 |
| 2005/0180415 A1* | 8/2005 | Cheung | H04L 1/0009 |
| | | | 348/E7.071 |
| 2005/0262529 A1* | 11/2005 | Neogi | H04N 21/63345 |
| | | | 725/31 |
| 2007/0053303 A1* | 3/2007 | Kryuchkov | H04L 43/0852 |
| | | | 370/252 |
| 2008/0075031 A1* | 3/2008 | Ohayon | H04L 47/25 |
| | | | 370/316 |
| 2008/0170630 A1* | 7/2008 | Falik | H04N 21/6582 |
| | | | 375/E7.193 |
| 2008/0192119 A1* | 8/2008 | Li | H04N 21/44209 |
| | | | 348/180 |
| 2008/0259962 A1* | 10/2008 | Mori | H04N 21/4305 |
| | | | 375/E7.278 |
| 2009/0158326 A1* | 6/2009 | Hunt | G06F 16/743 |
| | | | 725/38 |
| 2009/0276821 A1* | 11/2009 | Amento | H04N 7/17318 |
| | | | 725/116 |
| 2010/0080305 A1* | 4/2010 | Guo | H04N 21/4382 |
| | | | 375/E7.279 |
| 2010/0091888 A1* | 4/2010 | Nemiroff | H04N 19/115 |
| | | | 375/E7.154 |
| 2011/0222669 A1* | 9/2011 | Buriano | H04L 65/752 |
| | | | 379/32.01 |
| 2012/0042091 A1* | 2/2012 | McCarthy | H04N 21/812 |
| | | | 709/231 |
| 2012/0116758 A1* | 5/2012 | Murgia | G10L 19/24 |
| | | | 704/226 |
| 2013/0028121 A1* | 1/2013 | Rajapakse | H04L 69/163 |
| | | | 370/252 |
| 2013/0044803 A1* | 2/2013 | Fisher | H04N 21/8455 |
| | | | 709/231 |
| 2013/0089140 A1* | 4/2013 | Kudana | H04N 19/172 |
| | | | 375/240.03 |
| 2013/0340023 A1* | 12/2013 | Yoshimoto | H04N 21/6375 |
| | | | 725/116 |
| 2014/0013342 A1* | 1/2014 | Swan | H04N 21/4821 |
| | | | 725/92 |
| 2014/0233587 A1* | 8/2014 | Liu | H04L 47/782 |
| | | | 370/468 |
| 2015/0082366 A1* | 3/2015 | French | H04N 21/6371 |
| | | | 725/116 |
| 2015/0189394 A1* | 7/2015 | French | H04N 21/4381 |
| | | | 725/109 |
| 2016/0165266 A1* | 6/2016 | Bocharnikov | H04N 21/242 |
| | | | 725/109 |
| 2016/0261896 A1* | 9/2016 | Bocharnikov | H04N 21/23424 |
| 2016/0295254 A1* | 10/2016 | Chen | H04N 21/23406 |
| 2017/0111686 A1* | 4/2017 | Quere | H04N 21/4305 |
| 2017/0302378 A1* | 10/2017 | Mutalik | H04Q 11/0067 |
| 2018/0295050 A1* | 10/2018 | Lee | H04L 43/087 |
| 2019/0014050 A1* | 1/2019 | Wang | H04L 49/9005 |
| 2019/0116057 A1* | 4/2019 | Colson | H04N 21/6168 |
| 2019/0207690 A1* | 7/2019 | Mäki | H04Q 11/00 |
| 2019/0327499 A1* | 10/2019 | Poli | H04N 21/23614 |
| 2022/0053491 A1* | 2/2022 | Sevindik | H04L 27/0002 |

* cited by examiner

200

Obtain one or more performance metrics corresponding to a receiver receiving frames of an application via a network, wherein the performance metrics include information indicative of a current occupancy of a frame buffer of the receiver and information indicative of a target occupancy of the frame buffer of the receiver. 210

Adjust, based at least on the one or more performance metrics corresponding to the receiver, a frame rate associated with rendering at least one next frame of the application to be displayed by the receiver. 220

Render the at least one next frame using the frame rate.

230

Upon rendering the at least one next frame, send, using the network, the at least one next frame to the receiver to be displayed.

Receive, using a network, a frame of an application from a server, the frame rendered using a first frame rate.

310

Determine one or more performance metrics associated with the frame, wherein the performance metrics include information indicative of a current occupancy of the frame buffer and information indicative of a target occupancy of the frame buffer.

320

Send, to the server, the one or more performance metrics for determining a second frame rate associated with rendering of a next frame of the application.

330

Receive, using the network, the next frame rendered using the second frame rate.

DYNAMICALLY REDUCING STUTTER AND LATENCY IN VIDEO STREAMING APPLICATIONS

TECHNICAL FIELD

At least one embodiment pertains to solutions for dynamically reducing stutter and latency in video streaming, such as cloud gaming. For example, at least one embodiment pertains to adjusting a rate at which video frames are rendered at a server to eliminate stutter and/or latency experienced by a client due to network latency (e.g., network jitter) according to various novel techniques described herein.

BACKGROUND

Typically, cloud gaming (e.g., gaming-on-demand or gaming-as-a-service) refers to a type of online gaming that runs a game application remotely on a server and streams game content directly to a client device. Cloud gaming may experience a lag (e.g., delay or latency) between an action of a user of the client device and the reaction of the server due to network conditions.

BRIEF DESCRIPTION OF DRAWINGS

FIG. 2 is a flow diagram of a method of dynamically reducing stutter and latency in video streaming, according to at least one embodiment;

FIG. 3 is a flow diagram of yet another method of dynamically reducing stutter and latency in video streaming, according to at least one embodiment;

DETAILED DESCRIPTION

Figure 1:
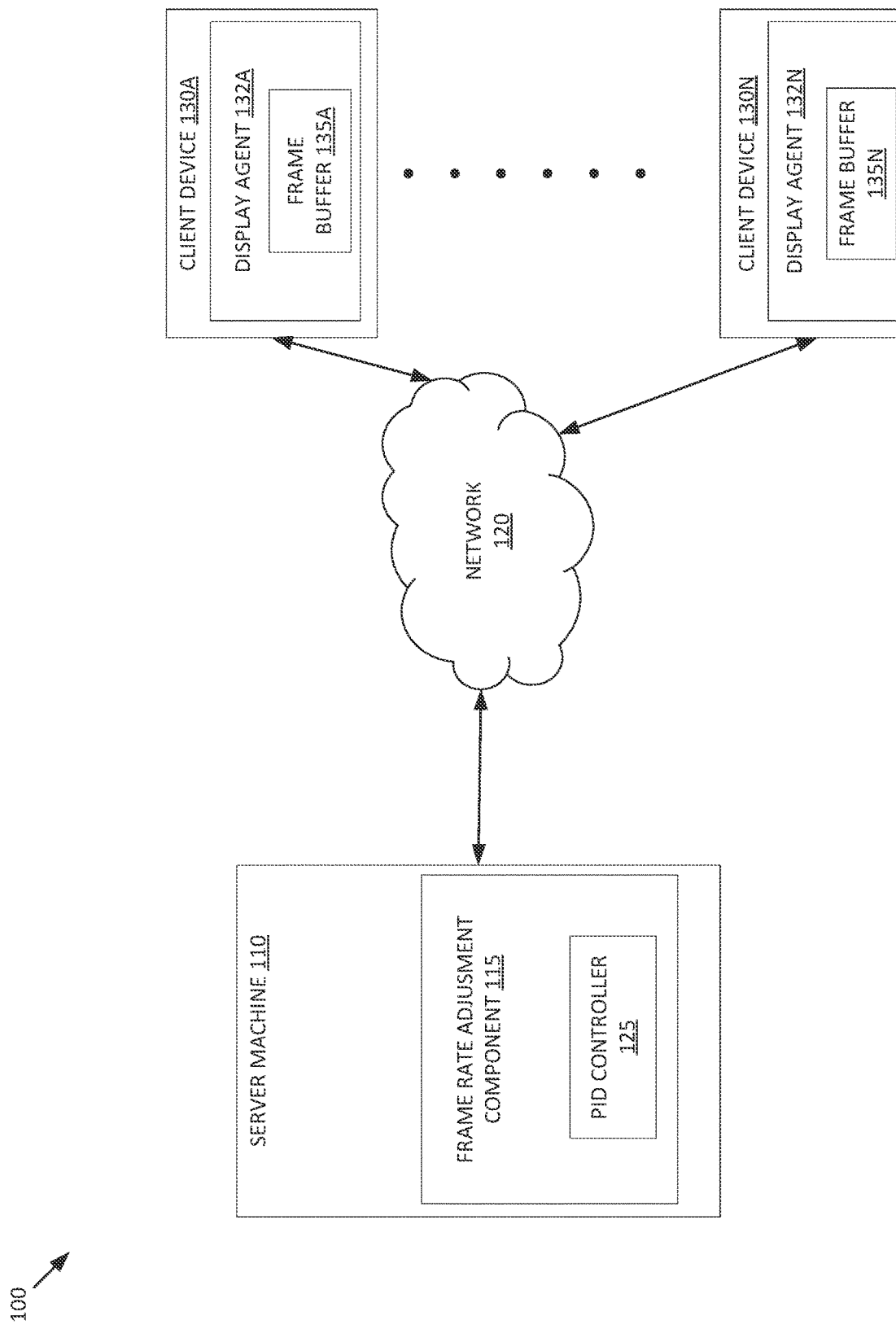
FIG. 1 is a block diagram of an example system architecture, according to at least one embodiment.

Cloud gaming (e.g., gaming-on-demand or gaming-as-a-service) refers to a type of video streaming platform that runs a gaming application remotely on a server and streams game content directly to a client device. Typically, a video streaming platform (e.g., cloud gaming) processes video (e.g., video) content through pipelines that include various stages, such as a rendering stage, a frame capture stage, a frame encoding stage, a frame packetizer stage, a transmission stage, a frame depacketizer stage, a frame decoding stage, a frame buffer stage, and a presentation stage. The rendering stage may refer to the stage in the pipeline in which video (e.g., game output) frames are rendered on the server according to a frame rate defined by frames per second (FPS) rate. The frame captures stage may refer to the stage in the pipeline in which rendered frames are captured immediately after being rendered to transmit to a client device. The frame encoding stage may refer to the stage in the pipeline in which captured frames of the video (e.g., game) are compressed into a compressed video format. The frame packetizer stage may refer to the stage in the pipeline in which the compressed video format is partitioned into a plurality of packets for transmission. The transmission stage may refer to the stage in the pipeline in which the plurality of packets is transmitted to the client device. The frame depacketizer stage may refer to the stage in the pipeline in which the plurality of packets is assembled into the compressed video format on the client device. The frame decoding stage may refer to the stage in the pipeline in which the compressed video format is decompressed into the frames. The frame buffer stage may refer to the stage in the pipeline in which the frames are populated (e.g., queued) into a frame buffer to prepare for display. The present stage may refer to the stage in the pipeline in which frames retrieved from the frame buffer are displayed.

Typically, due to changes in network connections, the transmission stage may encounter delays or drops of packets associated with a frame. Accordingly, frame arrivals can be delayed, causing stutter in the cloud gaming performance. In some instances, a frame buffer is implemented on the client device and used to queue multiple frames to absorb delays in the transmission stage and avoid stutter in the cloud gaming performance. In particular, frame rendering at the server can be deferred so that the frame buffer has multiple frames that can be presented at the client device while the client device is not receiving any additional frames from the server due to delays in the transmission stage. However, the deferral of frame rendering at the server and the queuing of multiple frames in the frame buffer can introduce game input latency and can cause the game to be unplayable.

Aspects of the present disclosure address the above and other deficiencies by providing techniques and methods for predictively adjusting a rendering frame rate (e.g., a rate at which a software application running on a server renders frames of a video) to control the occupancy of a frame buffer on the client device (e.g., frame buffer occupancy) and absorb network and processing jitter. In at least one embodiment, adjusting the rendering frame rate includes applying a delay prior to and/or during the rendering stage to ensure every rendered frame is streamed and presented. As opposed to arbitrarily setting the game FPS at the rendering stage to a high FPS (e.g., 120 Hz) and sampling at the video rate (e.g., 60 Hz), which causes dropped and/or repeated frames, aspects of the present disclosure adjust the FPS at the rendering stage using changes in the workload of the frame queue stage. Further, aspects of the present disclosure provide the ability to align frame arrival times at the client device with a client display vertical synchronization (VSync) interval, where a VSync interval refers to a number of frames per unit of time needed to be at the client in order to synchronize the application's frame rate with the refresh rate of a monitor of the client device.

In at least one embodiment, a proportional-integral-derivative (PID) controller is used to monitor network conditions, server performance, and client performance to dynamically control the occupancy of the frame buffer on the client device by adjusting the rendering frame rate. Accordingly, based on feedback from the client device, the PID controller can react to changes in the workload of the frame buffer to synchronize the rendering frame rate and a display rate of the frames during the presentation stage. A PID controller can refer to a control loop mechanism that automatically adjusts a control output based on a difference between a set point (a target value) and a measured process variable (measured process value that may deviate from the desired value). The PID controller used by the aspects of the present disclosure can cause a delay prior to and/or during the rendering stage to achieve optimal performance by matching a current frame buffer occupancy with a target frame buffer occupancy. For example, when the current frame buffer occupancy exceeds the target frame buffer occupancy, the PID controller can increase the delay to decrease the rendering frame rate and allow the frame buffer to drain frames to match the target frame buffer occupancy. Alternatively, when the current frame buffer occupancy does not exceed the target frame buffer occupancy, the PID controller can decrease the delay to increase the rendering frame rate and allow the frame buffer to populate and/or fill to match the target frame buffer occupancy.

In at least one embodiment, rather than using a PID controller, a trained machine learning model is used to predict how the rendering frame rate (server FPS) should be adjusted at the rendering stage using input from the client that indicates changes in the workload of the frame queue stage and current network conditions. The machine learning model can be trained using historical data collected through prior user sessions. The historical data may include, for each prior user session, recorded parameters such as network statistics, queue occupancy, missed frames, server FPS, etc. Based on the correspondence between the above-mentioned parameters associated with individual user sessions, the machine learning model would learn to predict what FPS would be ideal for a given input (e.g., current network condition parameters, current server FPS, current frame buffer occupancy, target frame buffer occupancy) at runtime. In at least one embodiment, the given input can also include the VSync interval.

Accordingly, aspects of the present disclosure decrease stutter with a minimal or negligent increase in latency. In addition, aspects of the present disclosure introduce varying rendering frame rates for the server to accommodate changes in the performance of the server, network, and client.

FIG. 1 is a block diagram of an example system architecture 100, according to at least one embodiment. The system architecture 100 (also referred to as "system" herein) includes a server 110 and client devices 130A-N (collectively and individually referred to as client 130), each connected to a network 120. Each client 130 can host a client component referred to herein as a display agent 132A-N (collectively and individually referred to as display agent 132), which includes a frame buffer (e.g., frame buffer 135A-N) (collectively and individually referred to as frame buffer 135).

In at least one embodiment, server 110 may include, without limitation, one or more processors representing one or a plurality of graphical processing units (GPUs), central processing units (CPUs), and/or any other processors. Server 110 may further include cache(s), data store(s), and/or other components and features not illustrated.

The server 110 may be part of an application hosting platform configured to host at least one application provided by an application developer. The application hosting platform may provide users with access to the application (or an instance of the application) via a respective client 130. The application hosting platform can be an example of a cloud-hosted gaming service platform, a cloud-hosted collaborative content creation platform for heterogeneous content creation applications, a video streaming hosting platform, a testing platform for simulated or augmented content, a machine learning training platform, a machine learning deployment platform, or a video conferencing hosting platform. In at least one embodiment, the application can be an example of a gaming application, a video conferencing application, a content creation application, a cloud-hosted application, a collaborative content creation application, a cloud-hosted collaborative content creation application, a video streaming application, a machine learning application, or a simulation application.

The application hosted by server 110 may render each frame according to a rendering frame rate (e.g., rendering FPS) for display via a user interface (UI) at client 130 running the display agent 132. Once a frame of the application is rendered, the application may transmit the rendered frame to the client 130 via network 120. Client 130 receives the rendered frame to be displayed. Client 130 may include one or more devices, including but not limited to televisions, smartphones, cellular telephones, personal digital assistants (PDAs), portable media players, netbooks, laptop computers, electronic book readers, tablet computers, desktop computers, set-top boxes, gaming consoles, and the like.

Each rendered frame received by the client 130 is displayed at a display frame rate (e.g., display FPS) (e.g., 60 Hz or every 16 ms). To achieve this display rate, once the rendered frame is received by the client 130, the rendered frame is temporarily stored in a frame buffer 135. Once a previously rendered frame is displayed by client 130, client 130 retrieves the next (e.g., subsequent) rendered frame from the frame buffer 135 to display according to the display frame rate. The rate at which the frame buffer 135 of client 130 is populated typically depends on the rendering frame rate and network conditions of network 120. Accordingly, each rendered frame on the frame buffer 135 may remain on the frame buffer 135 for longer than required, resulting in game input latency, and/or the rendered frame may not arrive in the frame buffer 135 in time to be displayed, thereby resulting in a stutter.

In some embodiments, server 110 includes a frame rate adjustment component 115 executed by one or more processors of server 110. The frame rate adjustment component 115 can vary the rendering frame rate of the application to manage the occupancy of the frame buffer 135, thereby reducing latency and stutter experienced by the client 130.

In at least one embodiment, the frame rate adjustment component 115 may receive, from display agent 132, a current occupancy of the frame buffer 135 and a target occupancy of the frame buffer 135. Depending on the embodiment, the frame adjustment component 115 may receive, in addition to the current occupancy of the frame buffer 135 and the target occupancy of the frame buffer 135, a predetermined frame buffer depletion rate (e.g., client display frame rate). The frame rate adjustment component 115 may adjust the pace of the rendering frame rate of the application by increasing or decreasing a delay applied prior to and/or during the rendering stage to adjust the current occupancy of the frame buffer 135 based on the target occupancy of the frame buffer 135 and the predetermined frame buffer depletion rate. As such, the frame buffer 135 may be depleted at a constant rate (e.g., the frame buffer depletion rate) and populated at a variable rate (e.g., based on the rendering frame rate).

The current occupancy of the frame buffer 135 may refer to a number of rendered frames of the application currently in the frame buffer. The target occupancy of the frame buffer 135 may refer to a number of rendered frames of the application that should be in the frame buffer to avoid stutter and latency. Depending on the embodiment, the unit of measurement of the current occupancy of the frame buffer and the target occupancy of the frame buffer may be measured in sub-millisecond intervals (e.g., less than a millisecond) rather than by frames and may represent how long a frame spent in the frame buffer. Accordingly, the current occupancy of the frame buffer and the target occupancy of the frame buffer may be a fractional number of frames (e.g., 0.5 or 1.5). The target occupancy of the frame buffer 135 may be determined based on a moving average of a transmission duration and a moving average of a presentation duration (e.g., a period of time between populating the frame buffer 135 with the frame and presenting the frame on the client device). In some embodiments, the transmission duration may be a period of time between the time server 110 sends the rendered frame and the time client 130 (e.g., display agent 132) receives the rendered frame. In another embodiment, the transmission duration may be a difference between an expected arrival time of the rendered frame by the client 130 (e.g., display agent 132) from server 110 and an actual arrival time of the rendered frame by the client 130 (e.g., display agent 132) from server 110. In some embodiments, the presentation duration may be a period of time the rendered frame remains in the frame buffer 135 before being presented on the display of the client 130. A moving average can be a statistic that captures the average change in a data series over time (e.g., a number of previously rendered frames over a predetermined time period). In some embodiments, rather than a moving average, an average transmission duration and/or an average presentation duration may be based on a moving window (e.g., a specific number of previously rendered frames during a moving time interval of a predefined size).

The target occupancy of the frame buffer can be periodically (e.g., frequently or constantly) calculated and adjusted to account for latency and/or stutter as more frames are received. In particular, to determine the target occupancy of the frame buffer, display agent 132 can calculate a sum of (i) a particular (e.g., 99.7th) percentile of the moving average of the transmission duration and (ii) a particular (e.g., 99.7th) percentile of the moving average of the presentation duration. For example, the 99.7th percentile can refer to at least +3 standard deviations from the moving average based on a Gaussian distribution (e.g., average transmission duration or average presentation duration during the past predetermined time period). Accordingly, the sum of (i) 99.7th percentile of the moving average of the transmission duration and (ii) 99.7th percentile of the moving average of the presentation duration can account for 99.7th percentile of all stutters that may occur during transmission and presentation of the rendered frame on the client 130.

In at least one embodiment, the frame rate adjustment component 115 may adjust the rendering frame rate of the application hosted on the server 110 to account for changes in workload of the frame buffer 135 due to network conditions of network 120 (e.g., network jitter) and/or performance of the client 130. For example, the frame rate adjustment component 115 can use a proportional-integral-derivative ("PID") controller 125 to receive feedback from client 130 (e.g., display agent 132) and dynamically adjust the rendering frame rate to achieve optimal performance by matching the current occupancy of the frame buffer 135 with the target occupancy of the frame buffer 135 to eliminate stutter, and latency client 130 may experience. The feedback received by the PID controller 125, as previously described, may be the current frame buffer occupancy and the target frame buffer occupancy calculated by the display agent 132. The PID controller 125, responsive to receiving the feedback, can dynamically increase and/or decrease the rendering frame rate to speed up and/or slow down the population of the frame buffer 135 to match the current frame buffer occupancy with the target frame buffer occupancy. Accordingly, the PID controller 125 can respond to changes in the workload of the frame buffer 135 by implementing a control loop mechanism. The control loop mechanism of the PID controller 12 can calculate a difference between a targeted frame buffer occupancy and a current frame buffer occupancy to apply a correction to the rendering frame rate, using proportional, integral, and derivative terms.

In some embodiments, the frame rate adjustment component 115 may use one or more trained machine learning models to receive feedback from the client 130 (e.g., current occupancy information of the frame buffer, target occupancy information of the frame buffer, current network condition parameters, and/or client Vsync interval). The one or more trained machine learning models may be trained (e.g., offline) using historical data associated with user sessions. For example, the one or more machine learning models may receive as input data network statistics, frame buffer occupancy, frames rendered but not presented by the client, server frame rate, and client display frame rate to train the one or more machine learning models to output a prediction of the ideal rendering frame rate of the server. Accordingly, during runtime, the frame rate adjustment component 115 may use the one or more trained machine learning models to receive feedback from the client (e.g., current frame buffer occupancy and target frame buffer occupancy) and current server frame rate as input and output an ideal frame rate for the rendering frame rate to be adjusted.

The frame rate adjustment component 115 may adjust the rendering frame rate by adjusting a delay applied prior to and/or during the rendering stage of the pipeline of the application. In particular, the frame rate adjustment component 115 can halt the pipeline at an optimal point for a period of time (e.g., the delay) to match the desired rendering frame rate. Thus, if the frame rate adjustment component 115 wishes to increase the rendering frame rate, the period of time (e.g., the delay) can be decreased to shorten the period of time the pipeline is halted. If the frame rate adjustment component 115 wishes to decrease the rendering frame rate, the period of time (e.g., the delay) can be increased to lengthen the period of time the pipeline is halted.

In some embodiments, to halt the rendering stage, the application may be delayed prior to a specific point during the rendering stage. For example, the rendering stage may include a plurality of execution phases (operations) that need to be completed to render a frame of the application. In some embodiments, by delaying the application prior to the specific point during the rendering stage (e.g., a specific execution phase of the rendering stage), the application can delay reading input data and calculating 3D objects matrices. As a result, the rendering frame rate is capped and minimizes latency since the input is sampled at the latest possible time. In another embodiment, the frame rate adjustment component 115 may decrease and/or increase the rendering frame rate by applying a delay after the frame is presented (e.g., after the presentation stage) to adjust the rendering frame rate to the desired rendering frame rate without interfering with the rendering stage.

In some embodiments, the frame rate adjustment component 115 may receive, in addition to the current occupancy of the frame buffer and the target occupancy of the frame buffer, a client display vertical synchronization (VSync) interval (e.g., a number of frames per unit of time to be received at the client in order to synchronize the application's frame rate with the refresh rate of a monitor of the client device).

Depending on the embodiment, the frame rate adjustment component 115 may be enabled or disabled based on feedback from client 130. In one embodiment, the frame rate adjustment component 115 may determine that the rendering frame rate cannot be aligned with the VSync interval for a predetermined time period (e.g., a few frames or 100 sub-milliseconds). In particular, the rendering frame rate may be limited to a frame rate based on an average frame rate of the previously rendered frames. Thus, if the rendering frame rate cannot be aligned with the VSync interval, the frame rate adjustment component 115 may be automatically (without user input) disabled and the rendering frame rate may be automatically set to the maximum rendering frame rate that can accommodate the VSync interval. Once it is detected that the rendering frame rate has exceeded the VSync interval, based on the average frame rate of the previously rendered frames, the frame rate adjustment component 115 may be enabled.

In another embodiment, the frame rate adjustment component 115 may identify, based on the feedback from the client 130, that the system 100 has experienced hostile network conditions (e.g., network silence followed by a sudden burst of network activity). In particular, the frame rate adjustment component 115 may determine that the rendered frames delivered via network 120 have not been received by client 130 for a period of time, and that this lack of received rendered fames for a period of time then followed by receiving multiple rendered frames (e.g., a burst of rendered frames) by client 130 at once. In response to detecting the hostile network conditions, the frame rate adjustment component 115 can be disabled and the rendering frame rate can be set to a fixed rendering frame rate matching the VSync interval. Additionally, server 130 may discard old frames and present the latest frame from the plurality of frames received by client 130 at once. Once the hostile network conditions are resolved and rendered frames are no longer received all at once, the frame rate adjustment component 115 may be enabled.

In another embodiment, the frame rate adjustment component 115 may determine that an actual time for rendering a frame (e.g., 30 ms) exceeds the expected time for rendering a frame (e.g., 20 ms) associated with the rendering frame rate (e.g., 50 FPS) set by the frame rate adjustment component 115. Thus, in response, the frame rate adjustment component 115 is disabled due to the frame being delivered late (e.g., 10 ms later than expected) indicating that the server 110 is unable to maintain the rendering frame rate set by the frame rate adjustment component 115. Once the actual time for rendering the frame meets and/or exceeds the expected time for rendering the frame associated with the rendering frame rate set by the frame rate adjustment component 115, the frame rate adjustment component 115 is enabled.

FIG. 2 is a flow diagram of a method 200 of dynamically reducing stutter and latency in video streaming, in accordance with at least one embodiment. FIG. 3 is a flow diagram of yet another method 300 of dynamically reducing stutter and latency in video streaming, in accordance with at least one embodiment.

Methods 200 and 300 can be performed by processing logic that can include a hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 or 300 is performed by the frame rate adjustment component 115 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used.

Referring to FIG. 2, at block 210, the processing logic obtains one or more performance metrics of a receiver (e.g., client device 130) receiving frames of an application via a network. The one or more performance metrics may include a current occupancy of a frame buffer of the receiver and a target occupancy of the frame buffer of the receiver. As previously described, the current occupancy of the frame buffer may refer to a number of rendered frames of the application currently in the frame buffer that are to be displayed. The target occupancy of the frame buffer refers to a number of rendered frames of the application that should be stored in the frame buffer for subsequent display to avoid stutter and latency.

The target occupancy of the frame buffer can be determined using at least one of (i) a first duration of time associated with a network jitter of the network or (ii) a second duration of time associated with a frame buffer. As previously described, the first duration may be a period of time between sending the rendered frame and receiving, by the receiver, the rendered frame or a difference between an expected arrival time of the rendered frame by the receiver and an actual arrival time of the rendered frame by the receiver. The second duration of time associated with the frame buffer may be a period of time the frames remained on a frame buffer of the receiver before the presentation of the frame on the display of the receiver. As previously described, the target occupancy of the frame buffer can be determined by calculating a sum of (i) a particular percentile (99.7th percentile) of a moving average of the first duration of time and (ii) a particular percentile (e.g., 99.7th percentile) of a moving average of the second duration of time. For example, the 99.7th percentile refers to at least +3 standard deviations from the moving average based on a Gaussian distribution. The moving average can refer to a statistic that captures the average change in a data series (e.g., the network jitter of the network or the frame buffer) over time. In some embodiments, a moving window may be implemented to obtain a specific number of previously rendered frames rather than a moving average.

At block 220, the processing logic adjusts, using the one or more performance metrics of the receiver, a frame rate associated with rendering at least one next frame of the application to be displayed by the receiver.

Responsive to determining that the current occupancy of the frame buffer exceeds the target occupancy of the frame buffer, the processing logic may adjust the frame rate by decreasing the frame rate to decrease the current occupancy of the frame buffer to match the target occupancy of the frame buffer. For example, the processing logic can decrease the frame rate by increasing a delay applied to an execution phase of a plurality of execution phases associated with rendering the at least one next frame (e.g., an execution phase of the rendering stage of the pipeline) or prior to a first execution phase of the plurality of execution phases associated with rendering the at least one next frame (e.g., prior to the rendering stage or to a first execution phase of the plurality of execution phases of the rendering stage).

Responsive to determining that the current occupancy of the frame buffer does not exceed the target occupancy of the frame buffer, the processing logic may adjust the frame rate by increasing the frame rate to increase the current occupancy of the frame buffer to match the target occupancy of the frame buffer. For example, the processing logic can increase the frame rate by decreasing a delay applied to an execution stage of a plurality of execution stages associated with rendering the at least one next frame (e.g., an execution phase of rendering stage) or prior to a first execution phase of the plurality of execution phases associated with rendering the at least one next frame (e.g., prior to the rendering stage or to a first execution phase of the plurality of execution phases of the rendering stage).

As described previously, a PID controller can be used to perform adjustment to the frame rate associated with rendering based on the one or more performance metrics. In particular, the PID controller can receive the one or more performance metrics (e.g., the current occupancy of the frame buffer and the target occupancy of the frame buffer) from the receiver and dynamically adjust the rendering frame rate to achieve optimal performance (e.g., matching the current occupancy of the frame buffer with the target occupancy of the frame rate) to eliminate stutter and latency. Thus, the PID controller can adjust the frame rate associated with rendering in response to changes in the workload of the frame buffer. The PID controller can implement a control loop mechanism used to calculate a difference between a targeted frame buffer occupancy and a current frame buffer occupancy to apply a correction to the frame rate associated with rendering, using proportional, integral, and derivative terms.

In at least one embodiment, the processing logic can also receive, in addition to the current occupancy of the frame buffer and the target occupancy of the frame buffer, a client display vertical synchronization (VSync) interval (e.g., a number of frames per unit of time to be received at the client in order to synchronize the application's frame rate with the refresh rate of a monitor of the client device), and the PID controller can adjust the frame rate associated with rendering to not only match the current occupancy of the frame buffer to the target occupancy of the frame buffer but to also ensure that frame arrival times at the receiver are aligned with the VSync interval, for example, the PID controller can adjust the frame rate associated with rendering to match a frame rate associated with the VSync interval. Accordingly, each frame of the application may arrive at the receiver just in time to allow the client to process and present the respective frame right before VSync happens. In at least one embodiment, the use of VSync may be enabled or disabled by a user of the client device. If enabled, a default VSync interval may be used, or a VSync interval can be provided by the user. If VSync is enabled, the one or more performance metrics provided by the receiver can include a VSync interval, and the PID controller can adjust the frame rate associated with rendering to not only match the current occupancy of the frame buffer to the target occupancy of the frame buffer but to also ensure that frame arrival times at the receiver are aligned with the VSync interval. Alternatively, if VSync is disabled, the one or more performance metrics provided by the receiver do not include a VSync interval, and the PID controller adjusts the frame rate associated with rendering to match the current occupancy of the frame buffer to the target occupancy of the frame buffer (without accounting for a VSync interval).

At block 230, the processing logic can render at least one next frame using the frame rate. At block 240, upon rendering the at least one next frame, the processing logic can send, using the network, the at least one next frame to the receiver to be displayed.

Referring to FIG. 3, at block 310, the processing logic can receive, using a network, a frame of an application from a server, the frame rendered using (e.g., according to) a first frame rate.

At block 320, the processing logic can determine performance metrics associated with the frame. The one or more performance metrics may include a current occupancy of the frame buffer and a target occupancy of the frame buffer. As previously described, the current occupancy of the frame buffer can refer to a number of rendered frames of the application currently in the frame buffer that are to be displayed. The target occupancy of the frame buffer can refer to a number of rendered frames of the application that should be in the frame buffer to avoid stutter and latency.

The target occupancy of the frame buffer can be determined using at least one of (i) a first duration of time associated with a network jitter of the network or (ii) a second duration of time associated with a frame buffer. As previously described, the first duration may be a period of time between sending the rendered frame and receiving by the receiver the rendered frame or a difference between an expected arrival time of the rendered frame by the receiver and an actual arrival time of the rendered frame by the receiver. The second duration of time associated with the frame buffer may be a period of time the frames remained in a frame buffer of the receiver before the presentation of the frame on the display. As previously described, the target occupancy of the frame buffer is determined by calculating a sum of (i) a particular (e.g., 99.7th) percentile of a moving average of the first duration of time and (ii) a particular (e.g., 99.7th) percentile of a moving average of the second duration of time. For example, the 99.7th percentile refers to at least +3 standard deviations from the moving average based on a Gaussian distribution. The moving average can refer to a statistic that captures the average change in a data series (e.g., the network jitter of the network or the frame buffer) over time. In some embodiments, a moving window may be implemented to obtain a specific number of previously rendered frames rather than a moving average.

In at least one embodiment, the one or more performance metrics can also include, in addition to the current occupancy of the frame buffer and the target occupancy of the frame buffer, a client display vertical synchronization (VSync) interval. The processing logic can determine the VSync interval using a default rate associated with a particular application (e.g., a particular gaming application) or a particular client device or a rate provided by the user of the client device.

At block 330, the processing logic can send, to the server, the one or more performance metrics for determining a second frame rate associated with the rendering of a next frame of the application. At block 340, the processing logic can receive, using the network, the next frame that is rendered using the second frame rate.

The server may determine a second frame rate by adjusting a first frame rate based on the received performance metrics and assigning the adjusted first frame rate to the second frame rate. In some embodiments, adjusting the first frame rate to the second frame rate based on the one or more performance metrics may be performed by a PID controller of the server. As described previously, the server, responsive to determining that the current occupancy of the frame buffer exceeds the target occupancy of the frame buffer, can decrease the first frame rate to a second frame rate in which the second frame rate is less than the first frame rate. The first frame rate can be decreased to the second frame rate to decrease the current occupancy of the frame buffer to match the target occupancy of the frame buffer. The server can decrease the first frame rate to the second frame rate by increasing a delay applied to an execution stage of a plurality of execution stages associated with rendering the next frame or prior to a first execution stage of the plurality of execution stages associated with rendering the next frame.

Alternatively, responsive to determining that the current occupancy of the frame buffer does not exceed the target occupancy of the frame buffer, the server can increase the first frame rate to a second frame in which the second frame rate is more than the first frame rate. The first frame rate can be increased to the second frame rate to increase the current occupancy of the frame buffer to match the target occupancy of the frame. The server can increase the first frame rate to the second frame rate by decreasing a delay applied to an execution stage of a plurality of execution stages associated with rendering the next frame or prior to a first execution stage of the plurality of execution stages associated with rendering the next frame.

In some embodiments, in which the one or more performance metrics include a client display vertical synchronization (VSync) interval, the server can change the first rate to the second rate based on determining that the first rate associated with rendering does not match the client VSync interval. For example, if the first rate exceeds the client VSync interval, the server may decrease the first rate to the second rate to match the client VSync interval, and if the first rate does not exceed the client VSync interval, the server may increase the first rate to the second rate to match the client VSync interval. Accordingly, each frame of the application may arrive from the server just in time for display on the monitor of the client device.

Figure 4:
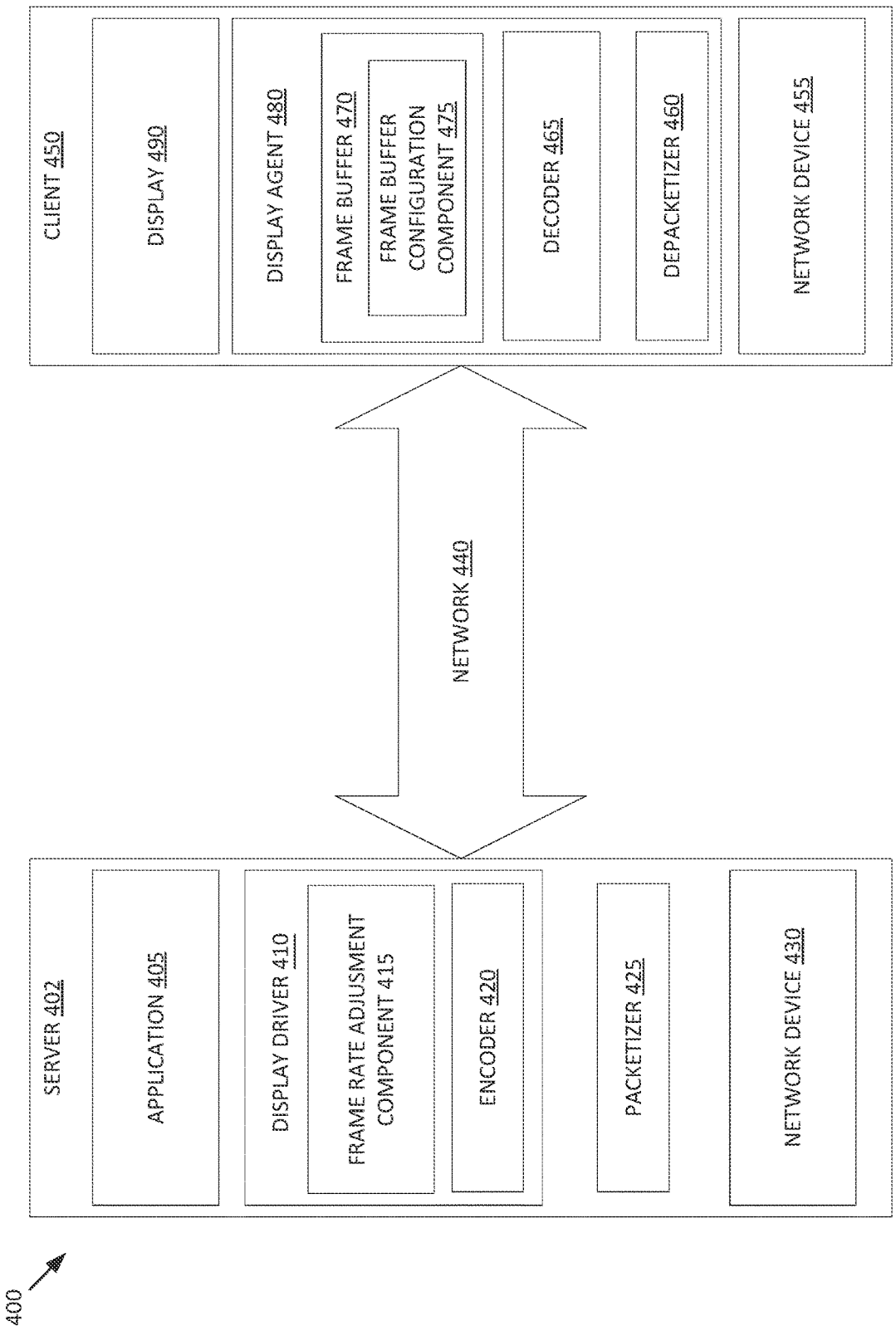
FIG. 4 is yet another block diagram of an example system architecture for dynamically reducing stutter and latency in video streaming, according to at least one embodiment.

FIG. 4 is a block diagram of yet another example system architecture 400, according to at least one embodiment. The system architecture 400 (also referred to as "system" herein) includes a server 402 and a client device (e.g., client) 450 connected via a network 440. Server 402 includes an application 405, a display driver 410, and a network device 430. Client 450 includes a network device 455, a display agent 480, and a display 490.

The application 405 renders frames to be submitted to the display driver 410 via an application programming interface (API) of the graphics processing unit (GPU). For example, a gaming application running on the server (e.g., on a virtual machine or container hosted by the server) can render the frame of a video game and submit the rendered frames to the display driver 410 via an API of the GPU. The display driver 410 can include an encoder 420 and a packetizer 425. Once the frame is rendered and submitted to the display driver 410, the encoder 420 of the display driver 410 (e.g., H. 264 encoder) may encode the rendered frames for transmission to client 450. In particular, the encoder 420 can encode each rendered frame of the application 405 by converting the frame (e.g., the frame of the video game) to a digital format (e.g., H. 264 raw data). The packetizer 425 may packetize the encoded frame (e.g., the frame encoded by the encoder 420) for transmission over network 440 via network device 430. Packetizing the encoded frame may include partitioning the encoded frame into a plurality of packets (e.g., formatted units of data) to be carried by a network (e.g., network 440). Server 402 may transmit the plurality of packets via network 440 to client 450. Due to various network conditions (e.g., network jitter), packets of the plurality of packets associated with the rendered frame may be lost during transmission or take longer to be transmitted to the client 450. Depending on the embodiment, the plurality of packets may successfully reach the client 450 through error corrections, transmission retries, or other suitable methods to ensure transmission of the plurality of packets.

The display agent 480 of client 450 can provide user access to application 405 (e.g., by streaming a video game to client 450 and causing it to be presented on display 490). The display agent 480 may receive the packetized encoded frame via a network device 455 connected to network 440. The display agent 480 may include a depacketizer 460, a decoder 465, and a frame buffer 470. The depacketizer 460 may depacketize the packetized encoded frame to produce the encoded frame transmitted by server 402. For example, to depacketize the packetized encoded frame, client 450 can reconstruct (e.g., combine) the plurality of packets used in transmission into the encoded frame (e.g., to generate the encoded frame from the plurality of packets). Once the encoded frame is generated, the decoder 465 of the display agent 480 may decode the encoded frame. In one or more embodiments, the encoder 420 may be a software implemented encoder or a dedicated hardware accelerated encoder configured to encode data substantially compliant with one or more data encoding formats or standards, including, without limitation, H.263, H.264 (AVC), H.265 (HEVC), H.266, VVC, EVC, AVC, AV1, VP8, VP9, MPEG4, 3GP, MPEG2, and any other video or multimedia standard formats. For example, the decoder 465 can convert the encoded frame in the digital format (e.g., H.264 raw data) into a frame (e.g., images) to be displayed on display 490 of the client 450. The display agent 480 may populate the frame buffer 470 to ensure proper display of the frames of the application 402 at a display frame rate of the client 450. The frame buffer 470 may include a sufficient (just enough) number of frames to ensure that the frames of the application 405 (e.g., frames of the video game) are displayed at the desired display frame rate.

Based on an occupancy of the frame buffer 470, client 450 may experience stutter and/or latency. Accordingly, to absorb the stutter and/or latency caused by the frame buffer 470, the frame rate adjustment component 415 may control the rate at which the frame buffer 135 of client 130 is populated by adjusting a rendering frame rate of the application 405 hosted on server 402. In particular, the frame rate adjustment component 415 may receive from the client 450 a current occupancy of the frame buffer 470 and a target occupancy of the frame buffer 470.

The current occupancy of the frame buffer 470 refers to a number of rendered frames of the application 405 currently in the frame buffer 470 that are to be displayed on display 490. The target occupancy of the frame buffer 470 refers to a number of rendered frames of application 405 that should be in the frame buffer 470 to avoid stutter and latency. The target occupancy of the frame buffer 470 may be determined based on a moving average of a transmission duration (e.g., between network device 430 and network 455) and a moving average of a presentation duration (e.g., a period of time between populating the frame buffer 470 and presenting the rendered frame on display 490). In some embodiments, the transmission duration may be a period of time between server 402 sending the rendered frame and client 450 receiving the rendered frame. In another embodiment, the transmission duration may be a difference between an expected arrival time of the rendered frame by the client 450 from server 402 and an actual arrival time of the rendered frame by the client 450 from server 402. A moving average can be a statistic that captures the average change in a data series over time (e.g., previously rendered frames over a predetermined time period). In some embodiments, rather than a moving average, an average transmission duration and/or an average presentation duration may be based on a moving window (e.g., a specific number of previously rendered frames during a moving time interval of a predefined duration).

The target occupancy of the frame buffer can be periodically (e.g., frequently/constantly) calculated and adjusted to account for latency and/or stutter as more frames are received. The target occupancy of the frame buffer 470 can be determined by a frame buffer configuration component 475 used to determine the optimal occupancy of the frame buffer to absorb stutter and/or latency. The frame buffer configuration component 475 can determine the target occupancy of the frame buffer 470 by calculating a sum of (i) a predetermined (e.g., 99.7th) percentile of the moving average of the transmission duration and (ii) a predetermined (e.g., 99.7th) percentile of the moving average of the presentation duration. For example, the 99.7th percentile refers to at least +3 standard deviations from the moving average based on a Gaussian distribution (e.g., average transmission duration or average presentation duration during the past predetermined time period). Accordingly, the sum of (i) 99.7th percentile of the moving average of the transmission duration and (ii) 99.7th percentile of the moving average of the presentation duration can account for 99.7th percentile of all stutters that may occur during transmission and presenting of the rendered frame on the client 450.

Once the target occupancy of the frame buffer 470 is determined by the frame buffer configuration component 475, the display agent 480 can transmit to the frame rate adjustment component 415, the target occupancy of the frame buffer 470, and the current occupancy of the frame buffer 470 to adjust the rendering frame rate of the application 405 to ensure that the current occupancy of the frame buffer 470 matches the target occupancy of the frame buffer 470.

The frame rate adjustment component 415 can increase the rendering frame rate of application 405 if the current occupancy of the frame buffer 470 does not exceed the target occupancy of the frame buffer 470 to match the current occupancy to the target occupancy. Alternatively, the frame rate adjustment component 415 can decrease the rendering frame rate of the application 405 if the current occupancy of the frame buffer 470 exceeds the target occupancy of the frame buffer 470 to match the current occupancy to the target occupancy. The frame rate adjustment component 415 may increase and/or decrease the rendering frame rate by adjusting a delay applied prior to and/or during the rendering stage (e.g., of the pipeline of the application 402). To render each frame of application 405, application 405 can include a plurality of execution phases responsible for rendering each frame (during the rendering stage). The frame rate adjustment component 415 can halt the rendering stage at an optimal point (e.g., a specific execution phase of the rendering stage of the application 405) for a period of time (e.g., the delay) to match the desired rendering frame rate. Thus, if the frame rate adjustment component 415 wishes to increase the rendering frame rate, the period of time (e.g., the delay) is decreased, thereby decreasing the time period the rendering stage is halted, and if the frame rate adjustment component 415 wishes to decrease the rendering frame rate, the period of time (e.g., the delay) is increased thereby increasing the time period the rendering phase is halted.

In some embodiments, rather than halting the rendering stage at an optimal point, the frame rate adjustment component 415 may delay the execution of the rendering stage of the pipeline (e.g., delaying the rendering stage or applying a delay to a first execution phase (e.g., simulation stage) of the plurality of execution phases of the rendering stage). In another embodiment, the frame rate adjustment component 415 may decrease and/or increase the rendering frame rate by applying a delay after the frame is presented (e.g., after the presentation stage) to adjust the rendering frame rate to the desired rendering frame rate without interfering with the rendering stage of the application.

Depending on the embodiment, the frame rate adjustment component 415 may adjust the rendering frame rate of the application 405 to match the rate and a phase at which the frames are encoded, packetized, and transmitted to the client 450 via network 440, thereby reducing latency and stutter in the server 402. Depending on the embodiment, the frame rate adjustment component 415 may include a PID controller to perform adjustments to the rendering frame rate to adjust the current occupancy of the frame buffer 470 to the target occupancy of the frame buffer 470. The frame rate adjustment component 415 can use the PID controller to adjust the rendering frame rate of the application 405 based on the current occupancy of the frame buffer 470 and the target occupancy of the frame buffer 470 (collectively and individually referred to as feedback). Accordingly, responsive to the PID controller receiving feedback and determining that the current occupancy of the frame buffer 470 does not exceed the target occupancy of the frame buffer 470, the PID controller can provide adjustment to the frame rate adjustment component 415 to increase the rendering frame rate. Responsive to the PID controller receiving feedback and determining that the current occupancy of the frame buffer 470 exceeds the target occupancy of the frame buffer 470, the PID controller can provide adjustment to the frame rate adjustment component 415 to decrease the rendering frame rate. Accordingly, the PID controller can react to the changes in the frame buffer 470 and can dynamically adjust the rendering frame rate of application 405. As previously described, the PID controller can implement a control loop mechanism used to calculate a difference between a targeted occupancy of the frame buffer 470 and a measured occupancy of the frame buffer 470 and apply a correction to the rendering frame rate of the application 405, using proportional, integral, and derivative terms.

Figure 5A:
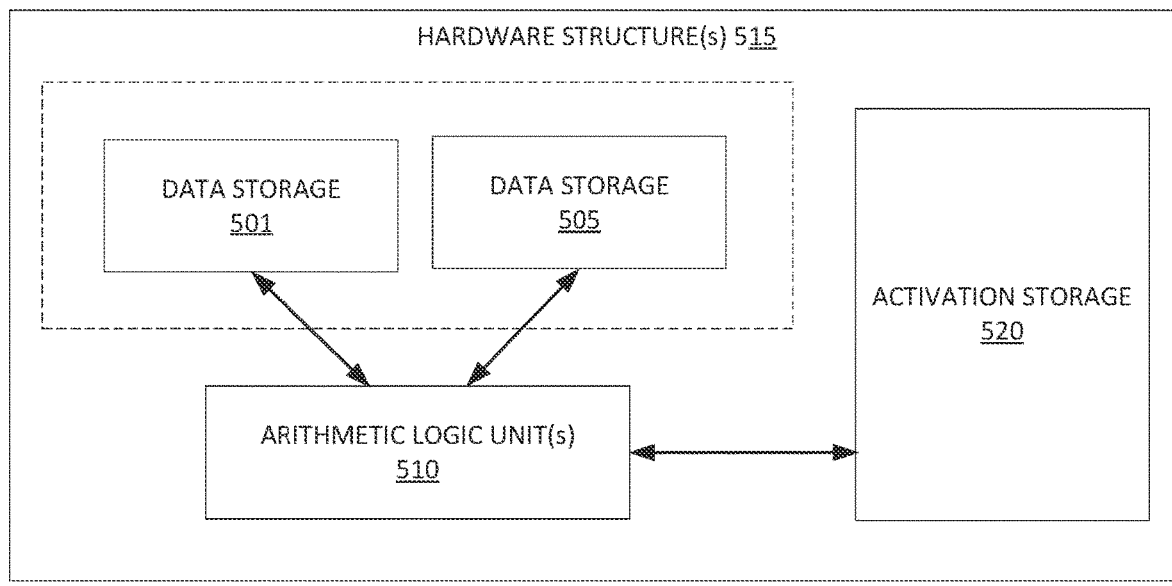
FIG. 5A illustrates inference and/or training logic, according to at least one embodiment.

FIG. 5A illustrates inference and/or training logic 515 used to perform inferencing and/or training operations associated with one or more embodiments. Details regarding inference and/or training logic 515 are provided below in conjunction with FIGS. 5A and/or 5B.

In at least one embodiment, inference and/or training logic 515 may include, without limitation, code and/or data storage 501 to store forward and/or output weight and/or input/output data, and/or other parameters to configure neurons or layers of a neural network trained and/or used for inferencing in aspects of one or more embodiments. In at least one embodiment, training logic 515 may include, or be coupled to code and/or data storage 501 to store graph code or other software to control the timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 501 may be included with other on-chip or off-chip data storage, including a processor's L1, L2, or L3 cache or system memory.

In at least one embodiment, any portion of code and/or data storage 501 may be internal or external to one or more processors or other hardware logic devices or circuits. In at least one embodiment, code and/or code and/or data storage 501 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 515 may include, without limitation, a code and/or data storage 505 to store backward and/or output weight and/or input/output data corresponding to neurons or layers of a neural network trained and/or used for inferencing in aspects of one or more embodiments. In at least one embodiment, code and/or data storage 505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 515 may include, or be coupled to code and/or data storage 505 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 505 may be included with other on-chip or off-chip data storage, including a processor's L1, L2, or L3 cache or system memory. In at least one embodiment, any portion of code and/or data storage 505 may be internal or external to on one or more processors or other hardware logic devices or circuits. In at least one embodiment, code and/or data storage 505 may be cache memory, DRAM, SRAM, non-volatile memory (e.g., Flash memory), or other storage. In at least one embodiment, choice of whether code and/or data storage 505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 501 and code and/or data storage 505 may be separate storage structures. In at least one embodiment, code and/or data storage 501 and code and/or data storage 505 may be same storage structure. In at least one embodiment, code and/or data storage 501 and code and/or data storage 505 may be partially same storage structure and partially separate storage structures. In at least one embodiment, any portion of code and/or data storage 501 and code and/or data storage 505 may be included with other on-chip or off-chip data storage, including a processor's L1, L2, or L3 cache or system memory.

In at least one embodiment, inference and/or training logic 515 may include, without limitation, one or more arithmetic logic unit(s) ("ALU(s)") 510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 520 that are functions of input/output and/or weight parameter data stored in code and/or data storage 501 and/or code and/or data storage 505. In at least one embodiment, activations stored in activation storage 520 are generated according to linear algebraic and or matrix-based mathematics performed by ALU(s) 510 in response to performing instructions or other code, wherein weight values stored in code and/or data storage 505 and/or code and/or data storage 501 are used as operands along with other values, such as bias values, gradient information, momentum values, or other parameters or hyperparameters, any or all of which may be stored in code and/or data storage 505 or code and/or data storage 501 or another storage on or off-chip.

In at least one embodiment, ALU(s) 510 are included within one or more processors or other hardware logic devices or circuits, whereas in another embodiment, ALU(s) 510 may be external to a processor or other hardware logic device or circuit that uses them (e.g., a co-processor). In at least one embodiment, ALUs 510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 501, code and/or data storage 505, and activation storage 520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 520 may be cache memory, DRAM, SRAM, non-volatile memory (e.g., Flash memory), or other storage. In at least one embodiment, activation storage 520 may be completely or partially within or external to one or more processors or other logical circuits. In at least one embodiment, choice of whether activation storage 520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 515 illustrated in FIG. 5A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5A may be used in conjunction with central processing unit ("CPU") hardware, graphics processing unit ("GPU") hardware or other hardware, such as data processing unit ("DPU") hardware, or field programmable gate arrays ("FPGAs").

Figure 5B:
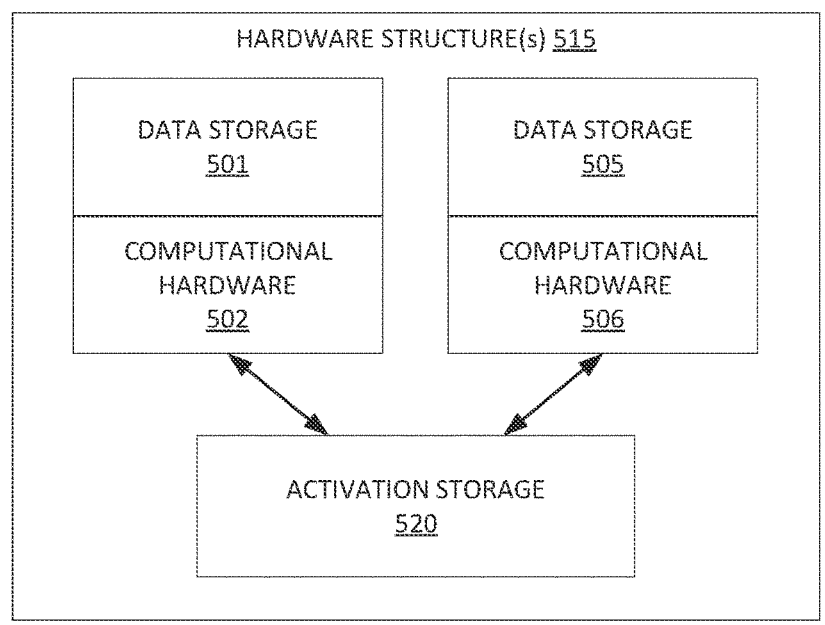
FIG. 5B illustrates inference and/or training logic, according to at least one embodiment.

FIG. 5B illustrates inference and/or training logic 515, according to at least one or more embodiments. In at least one embodiment, inference and/or training logic 515 may include, without limitation, hardware logic in which computational resources are dedicated or otherwise exclusively used in conjunction with weight values or other information corresponding to one or more layers of neurons within a neural network. In at least one embodiment, inference and/or training logic 515 illustrated in FIG. 5B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 515 includes, without limitation, code and/or data storage 501 and code and/or data storage 505, which may be used to store code (e.g., graph code), weight values and/or other information, including bias values, gradient information, momentum values, and/or other parameter or hyperparameter information. In at least one embodiment illustrated in FIG. 5B, each of code and/or data storage 501 and code and/or data storage 505 is associated with a dedicated computational resource, such as computational hardware 502 and computational hardware 506, respectively. In at least one embodiment, each of computational hardware 502 and computational hardware 506 comprises one or more ALUs that perform mathematical functions, such as linear algebraic functions, only on information stored in code and/or data storage 501 and code and/or data storage 505, respectively, result of which is stored in activation storage 520.

In at least one embodiment, each of code and/or data storage 501 and 505 and corresponding computational hardware 502 and 506, respectively, correspond to different layers of a neural network, such that resulting activation from one "storage/computational pair 501/502" of code and/or data storage 501 and computational hardware 502 is provided as an input to "storage/computational pair 505/506" of code and/or data storage 505 and computational hardware 506, in order to mirror conceptual organization of a neural network. In at least one embodiment, each of storage/computational pairs 501/502 and 505/506 may correspond to more than one neural network layer. In at least one embodiment, additional storage/computation pairs (not shown) subsequent to or in parallel with storage computation pairs 501/502 and 505/506 may be included in inference and/or training logic 515.

Figure 6:
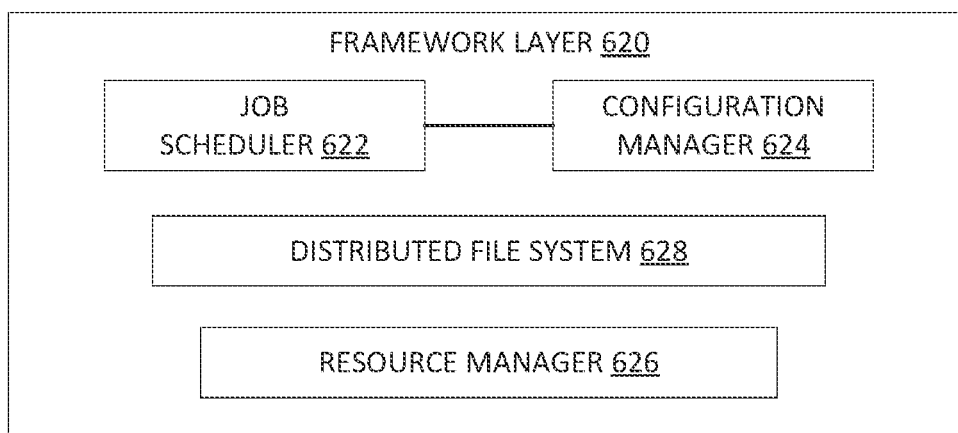
FIG. 6 illustrates an example data center system, according to at least one embodiment.

FIG. 6 illustrates an example data center 600, in which at least one embodiment may be used. In at least one embodiment, data center 600 includes a data center infrastructure layer 610, a software layer 630, and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator may include hardware, software or some combination thereof.

In at least one embodiment, as shown in FIG. 6, framework layer includes a job scheduler 622, a configuration manager 624, a resource manager 626 and a distributed file system 628. In at least one embodiment, framework layer may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resource 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 628 of framework layer. The one or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 628 of framework layer. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 624, resource manager 626, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

In at least one embodiment, data center 600 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 600. In at least one embodiment, trained machine learning models corresponding to one or more neural networks may be used to infer or predict information using resources described above with respect to data center 600 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 6 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 12:
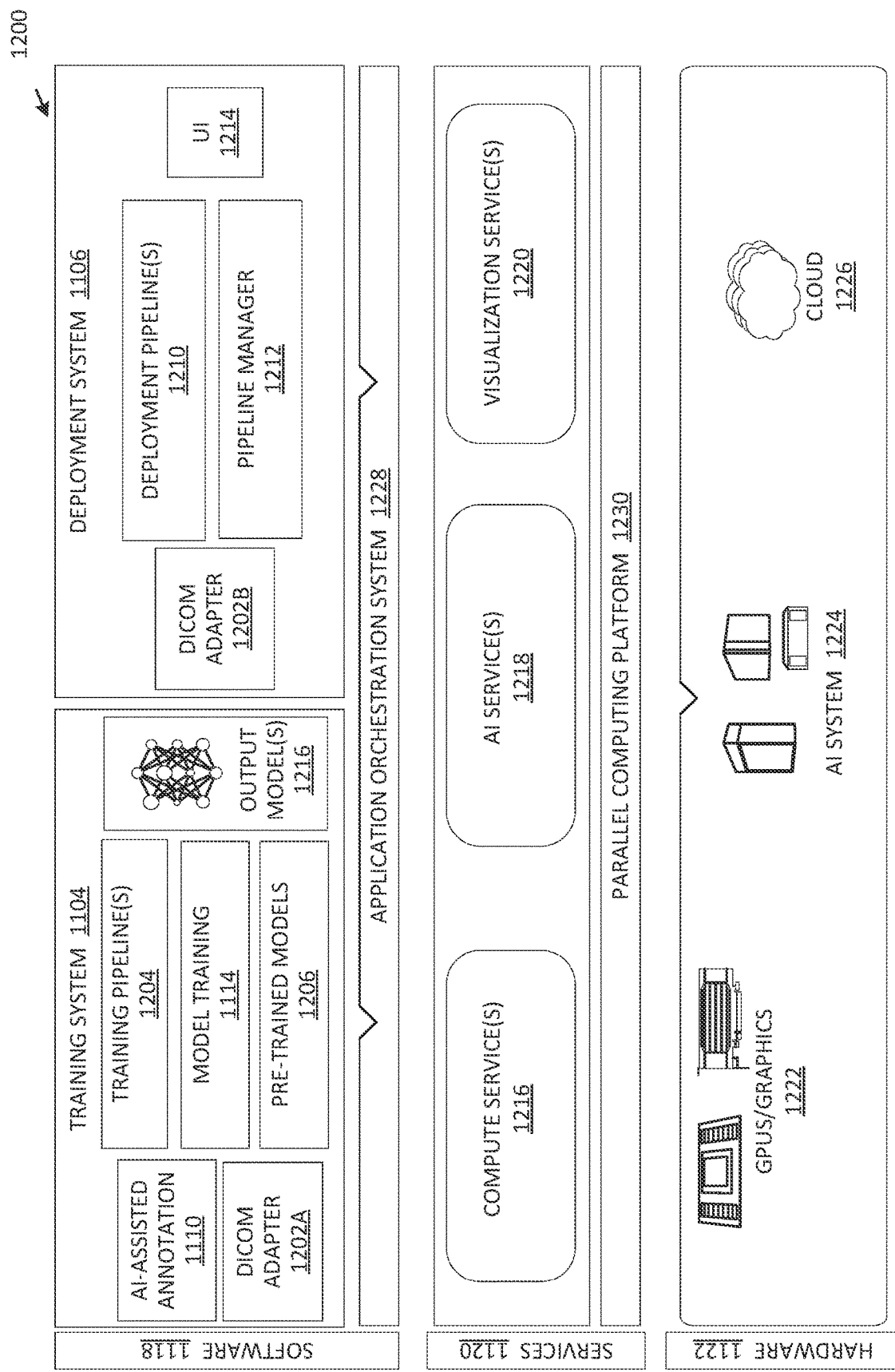
FIG. 12 is a system diagram for an example system for training, adapting, instantiating and deploying machine learning models in an advanced computing pipeline, in accordance with at least one embodiment.

FIG. 12 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, computer system may include, without limitation, a component, such as a processor to employ execution units including logic to perform algorithms for process data, in accordance with present disclosure, such as in embodiment described herein. In at least one embodiment, computer system may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system may include, without limitation, processor that may include, without limitation, one or more execution units to perform machine learning model training and/or inferencing according to techniques described herein. In at least one embodiment, computer system is a single processor desktop or server system, but in another embodiment computer system may be a multiprocessor system. In at least one embodiment, processor may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor may be coupled to a processor bus 1210 that may transmit data signals between processor and other components in computer system.

In at least one embodiment, processor may include, without limitation, a Level 1 ("L1") internal cache memory ("cache"). In at least one embodiment, processor may have a single internal cache or multiple levels of internal cache. In at least one embodiment, cache memory may reside external to processor. Other embodiments may also include a combination of both internal and external caches depending on particular implementation and needs. In at least one embodiment, register file may store different types of data in various registers including, without limitation, integer registers, floating point registers, status registers, and instruction pointer register.

In at least one embodiment, execution unit, including, without limitation, logic to perform integer and floating point operations, also resides in processor. In at least one embodiment, processor may also include a microcode ("ucode") read only memory ("ROM") that stores microcode for certain macro instructions. In at least one embodiment, execution unit may include logic to handle a packed instruction set. In at least one embodiment, by including packed instruction set in an instruction set of a general-purpose processor, along with associated circuitry to execute instructions, operations used by many multimedia applications may be performed using packed data in a general-purpose processor. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit may also be used in microcontrollers, embedded processors, graphics devices, DSPs, and other types of logic circuits. In at least one embodiment, computer system may include, without limitation, a memory 720. In at least one embodiment, memory 720 may be implemented as a Dynamic Random Access Memory ("DRAM") device, a Static Random Access Memory ("SRAM") device, flash memory device, or other memory device. In at least one embodiment, memory 720 may store instruction(s) 719 and/or data 721 represented by data signals that may be executed by processor.

In at least one embodiment, system logic chip may be coupled to processor bus 710 and memory 720. In at least one embodiment, system logic chip may include, without limitation, a memory controller hub ("MCH") 716, and processor may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor, memory 720, and other components in computer system and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through a high bandwidth memory path 718 and graphics/video card 77 may be coupled to MCH 716 through an Accelerated Graphics Port ("AGP") interconnect 714.

In at least one embodiment, computer system may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, chipset, and processor. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as Universal Serial Bus ("USB"), and a network controller 734, which may include in some embodiments, a data processing unit. Data storage 724 may comprise a hard disk drive, a floppy disk drive, a CD-ROM device, a flash memory device, or other mass storage device.

Figure 7:
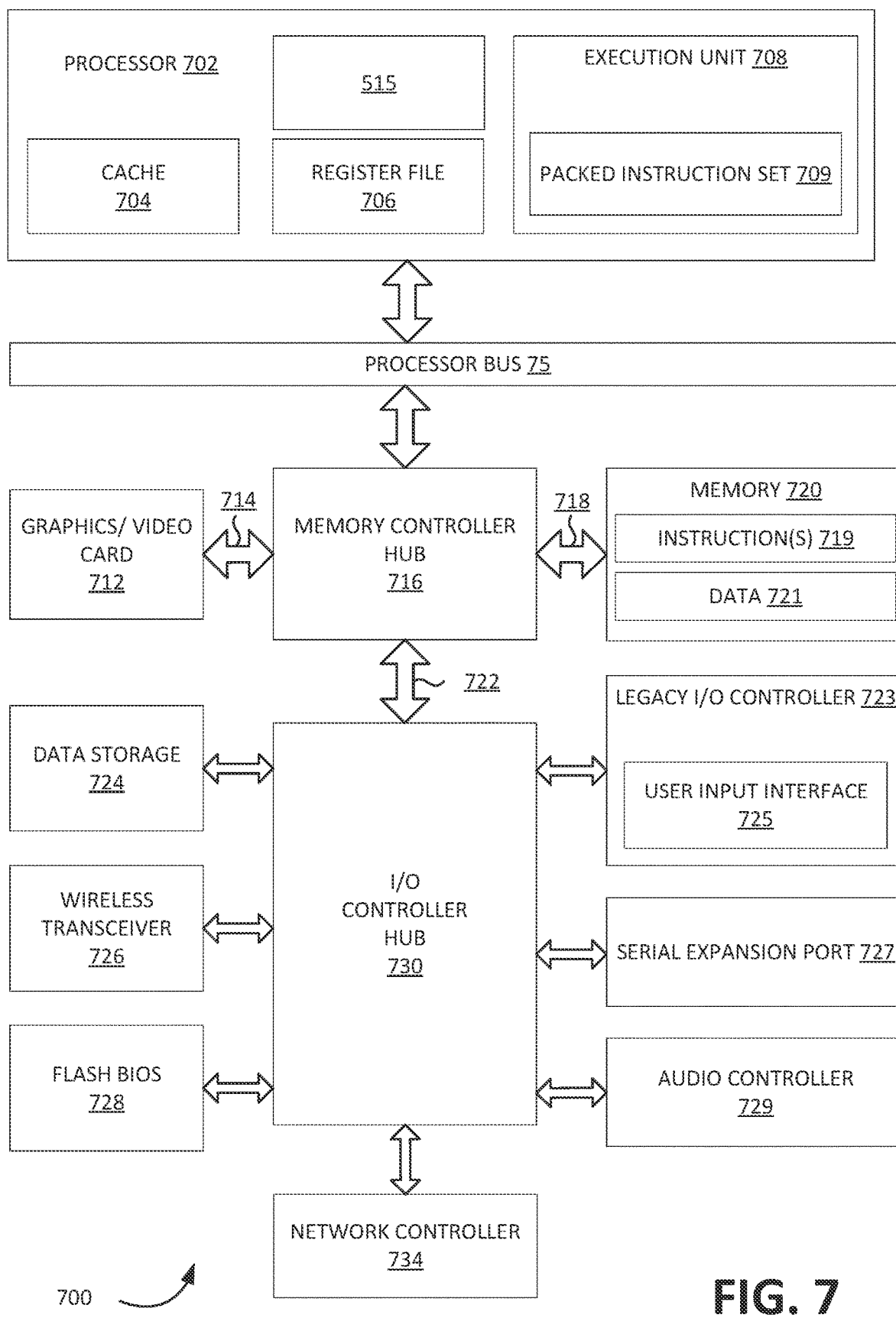
FIG. 7 illustrates a computer system, according to at least one embodiment.

In at least one embodiment, FIG. 7 illustrates a system, which includes interconnected hardware devices or "chips," whereas in other embodiments, FIG. 7 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system are interconnected using compute express link (CXL) interconnects.

Inference and/or training logic 515 are used to perform inferencing and/or training operations associated with one or more embodiments. Details regarding inference and/or training logic 515 are provided below in conjunction with FIGS. 10A and/or 10B. In at least one embodiment, inference and/or training logic 515 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
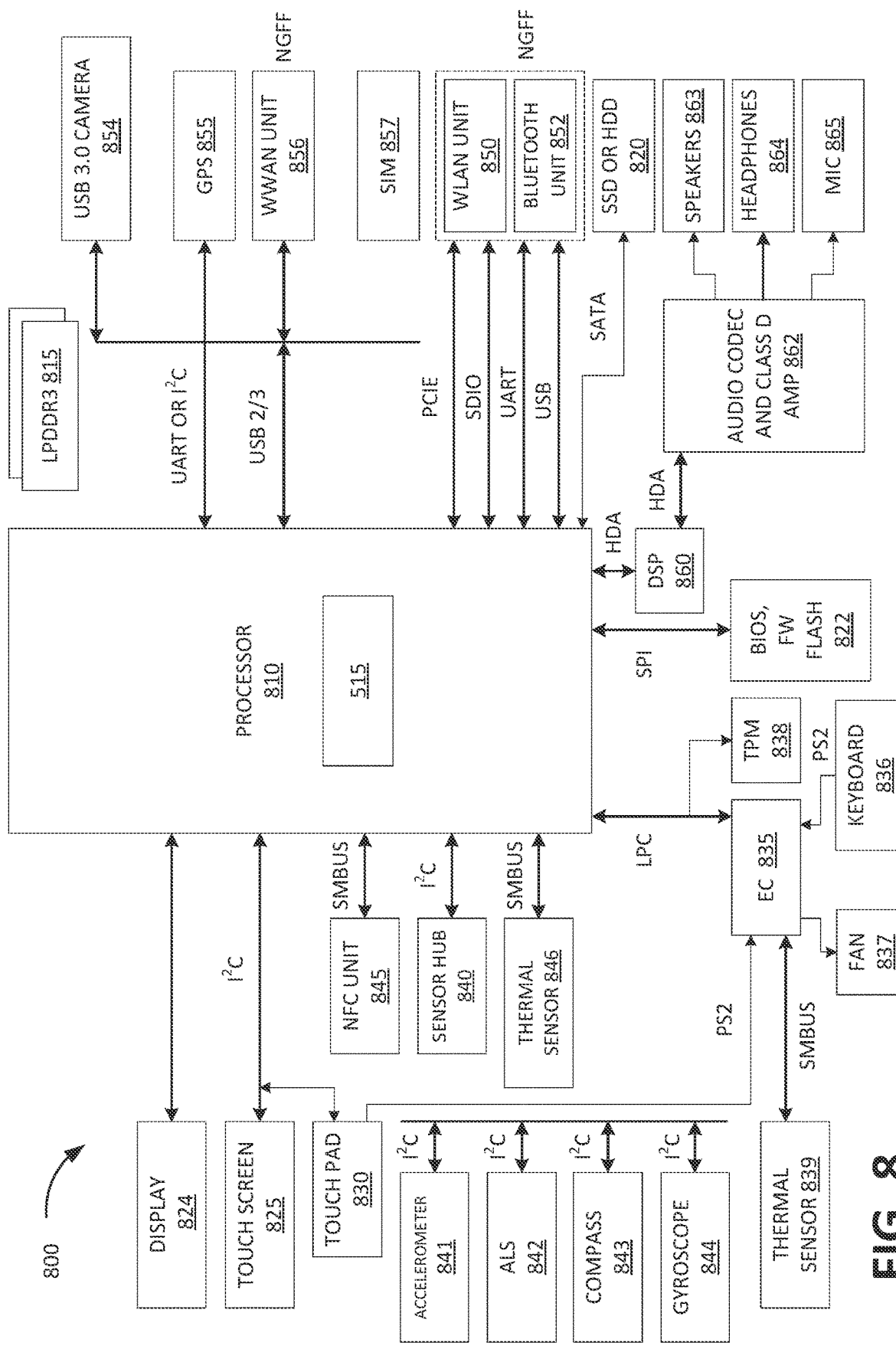
FIG. 8 illustrates a computer system, according to at least one embodiment.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 800 may include, without limitation, processor 810 communicatively coupled to any suitable number or kind of components, peripherals, modules, or devices. In at least one embodiment, processor 810 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 8 illustrates a system, which includes interconnected hardware devices or "chips," whereas in other embodiments, FIG. 8 may illustrate an exemplary System on a Chip ("SoC"). In at least one embodiment, devices illustrated in FIG. 8 may be interconnected with proprietary interconnects, standardized interconnects (e.g., PCIe) or some combination thereof. In at least one embodiment, one or more components of FIG. 8 are interconnected using compute express link (CXL) interconnects.

In at least one embodiment, FIG. 8 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) 855, a camera ("USB 3.0 camera") 854 such as a USB 3.0 camera, and/or a Low Power Double Data Rate ("LPDDR") memory unit ("LPDDR3") 815 implemented in, for example, LPDDR3 standard. These components may each be implemented in any suitable manner.

In at least one embodiment, other components may be communicatively coupled to processor 810 through components discussed above. In at least one embodiment, an accelerometer 841, Ambient Light Sensor ("ALS") 842, compass 843, and a gyroscope 844 may be communicatively coupled to sensor hub 840. In at least one embodiment, thermal sensor 839, a fan 837, a keyboard 836, and a touch pad 830 may be communicatively coupled to EC 835. In at least one embodiment, speaker 863, headphones 864, and microphone ("mic") 865 may be communicatively coupled to an audio unit ("audio codec and class d amp") 862, which may in turn be communicatively coupled to DSP 860. In at least one embodiment, audio unit 864 may include, for example and without limitation, an audio coder/decoder ("codec") and a class D amplifier. In at least one embodiment, SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Inference and/or training logic 515 are used to perform inferencing and/or training operations associated with one or more embodiments. Details regarding inference and/or training logic 515 are provided below in conjunction with FIGS. 10A and/or 10B. In at least one embodiment, inference and/or training logic 515 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
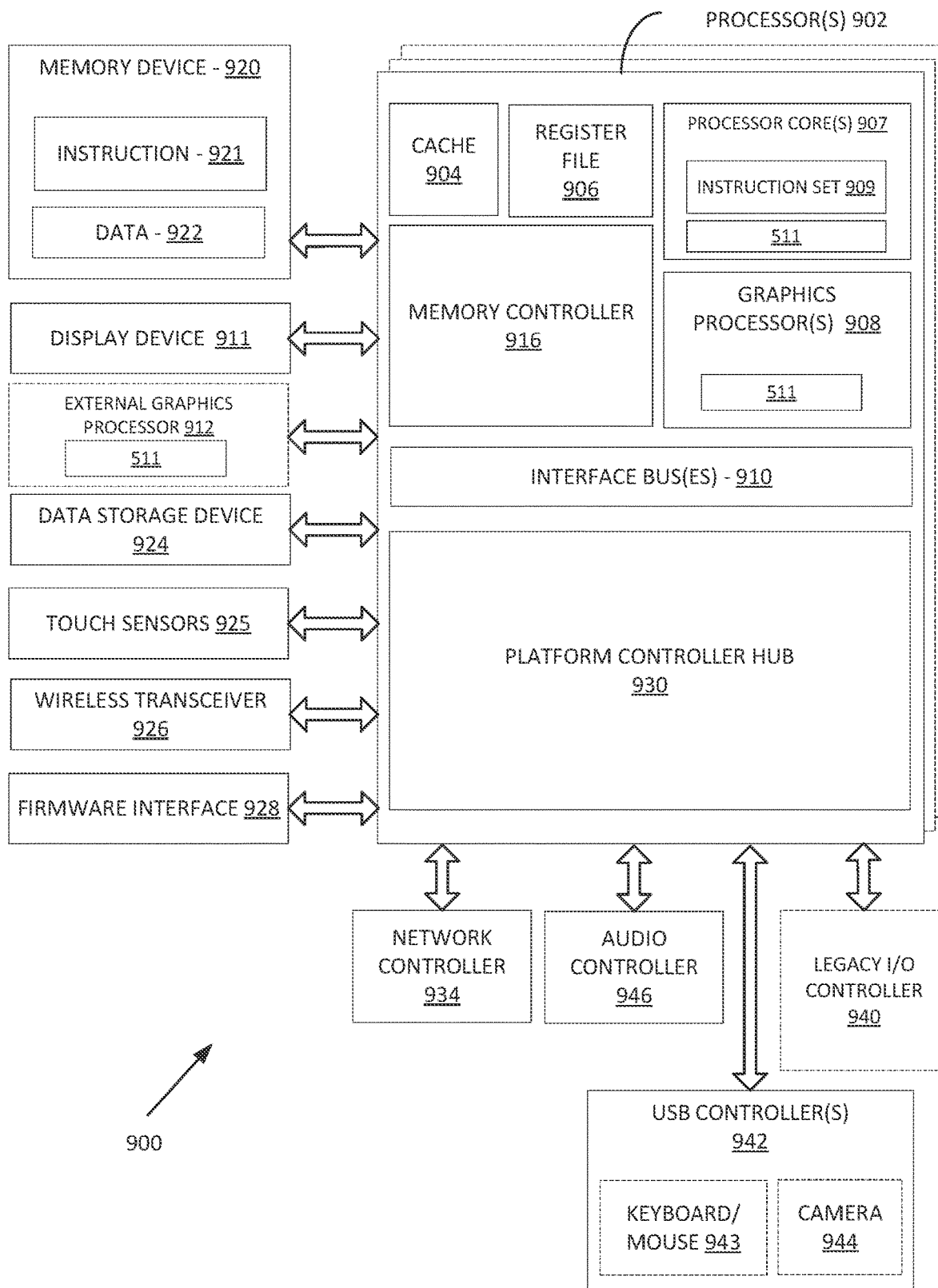
FIG. 9 illustrates at least portions of a graphics processor, according to one or more embodiments.

FIG. 9 is a block diagram of a processing system, according to at least one embodiment. In at least one embodiment, system 900 includes one or more processors 902 and one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, edge, or embedded devices.

In at least one embodiment, system 900 may include, or be incorporated within a server-based gaming platform, a game console, including a game and media console, a mobile gaming console, a handheld game console, or an online game console. In at least one embodiment, system 900 is a mobile phone, smart phone, tablet computing device or mobile Internet device. In at least one embodiment, processing system 900 may also include, couple with, or be integrated within a wearable device, such as a smart watch wearable device, smart eyewear device, augmented reality device, or virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction set 909. In at least one embodiment, instruction set 909 may facilitate Complex Instruction Set Computing (CISC), Reduced Instruction Set Computing (RISC), or computing via a Very Long Instruction Word (VLIW). In at least one embodiment, processor cores 907 may each process a different instruction set 909, which may include instructions to facilitate emulation of other instruction sets. In at least one embodiment, processor core 907 may also include other processing devices, such a Digital Signal Processor (DSP).

In at least one embodiment, processor 902 includes cache memory 904. In at least one embodiment, processor 902 may have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, register file 906 is additionally included in processor 902 which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910, in one embodiment, may be a processor bus, such as a version of a Direct Media Interface (DMI) bus. In at least one embodiment, interface 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, memory device 920 may be a dynamic random access memory (DRAM) device, a static random access memory (SRAM) device, flash memory device, phase-change memory device, or some other memory device having suitable performance to serve as process memory. In at least one embodiment memory device 920 may operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 may connect to processor(s) 902. In at least one embodiment display device 911 may include one or more of an internal display device, as in a mobile electronic device or a laptop device or an external display device attached via a display interface (e.g., DisplayPort, etc.). In at least one embodiment, display device 911 may include a head mounted display (HND) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 may connect via a storage interface (e.g., SATA) or via a peripheral bus, such as a Peripheral Component Interconnect bus (e.g., PCI, PCI Express). In at least one embodiment, touch sensors 925 may include touch screen sensors, pressure sensors, or fingerprint sensors. In at least one embodiment, wireless transceiver 926 may be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and may be, for example, a unified extensible firmware interface (UEFI). In at least one embodiment, network controller 934 may enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system. In at least one embodiment, platform controller hub 930 may also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 912. In at least one embodiment, platform controller hub 930 and/or memory controller 916 may be external to one or more processor(s) 902. For example, in at least one embodiment, system 900 may include an external memory controller 916 and platform controller hub 930, which may be configured as a memory controller hub and peripheral controller hub within a system chipset that is in communication with processor(s) 902.

Inference and/or training logic 515 are used to perform inferencing and/or training operations associated with one or more embodiments. Details regarding inference and/or training logic 515 are provided below in conjunction with FIGS. 10A and/or 10B. In at least one embodiment portions or all of inference and/or training logic 515 may be incorporated into graphics processor 1000. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 10:
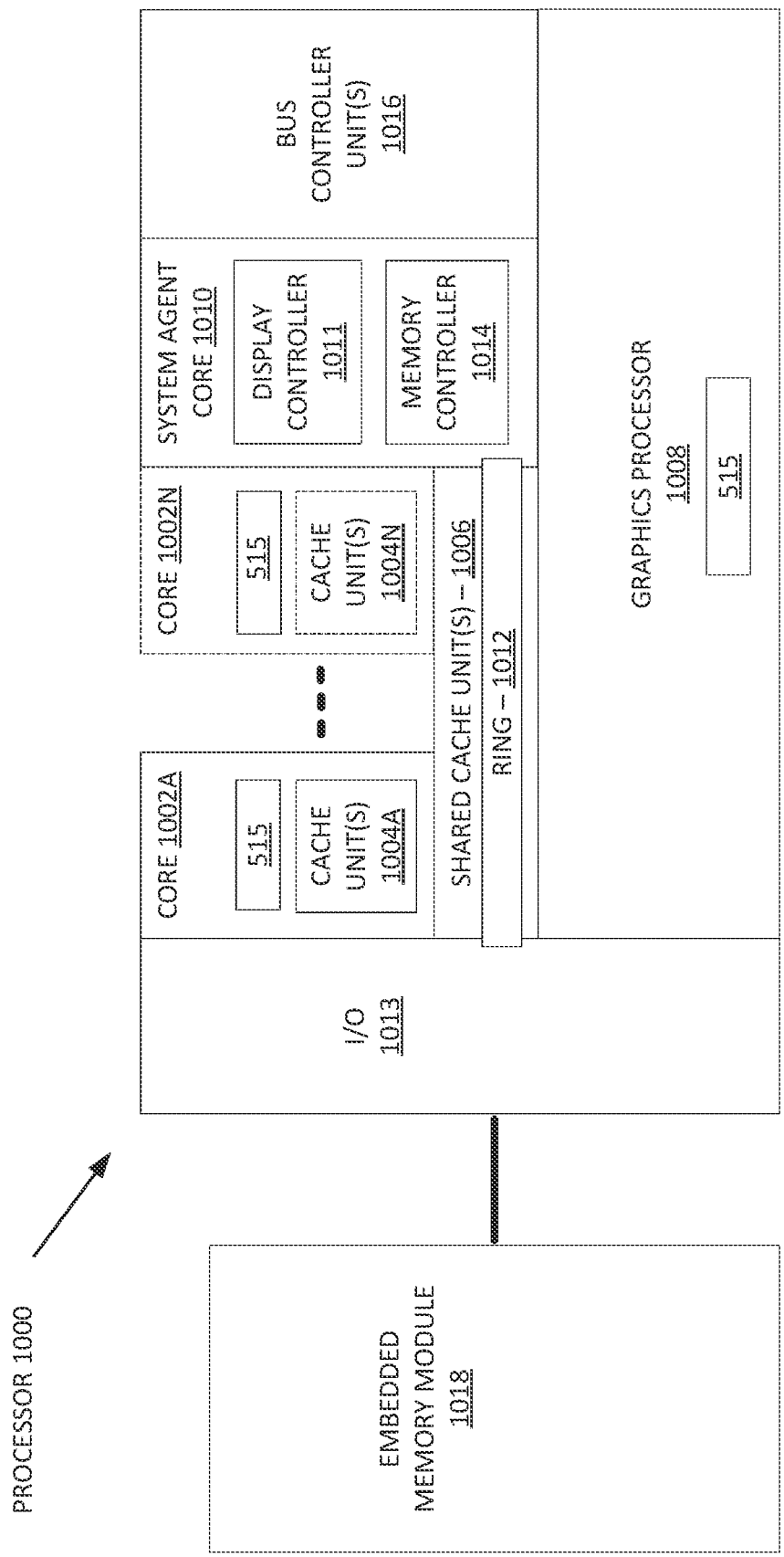
FIG. 10 illustrates at least portions of a graphics processor, according to one or more embodiments.

FIG. 10 is a block diagram of a processor 1000 having one or more processor cores 1002A-1002N, an integrated memory controller 1014, and an integrated graphics processor 1008, according to at least one embodiment. In at least one embodiment, processor 1000 may include additional cores up to and including additional core 1002N represented by dashed lined boxes. In at least one embodiment, each of processor cores 1002A-1002N includes one or more internal cache units 1004A-1004N. In at least one embodiment, each processor core also has access to one or more shared cached units 1006.

In at least one embodiment, internal cache units 1004A-1004N and shared cache units 1006 represent a cache memory hierarchy within processor 1000. In at least one embodiment, cache memory units 1004A-1004N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1006 and 1004A-1004N.

In at least one embodiment, processor 1000 may also include a set of one or more bus controller units 1016 and a system agent core 1010. In at least one embodiment, one or more bus controller units 1016 manage a set of peripheral buses, such as one or more PCI or PCI express busses. In at least one embodiment, system agent core 1010 provides management functionality for various processor components. In at least one embodiment, system agent core 1010 includes one or more integrated memory controllers 1014 to manage access to various external memory devices (not shown).

In at least one embodiment, one or more of processor cores 1002A-1002N include support for simultaneous multi-threading. In at least one embodiment, system agent core 1010 includes components for coordinating and operating cores 1002A-1002N during multi-threaded processing. In at least one embodiment, system agent core 1010 may additionally include a power control unit (PCU), which includes logic and components to regulate one or more power states of processor cores 1002A-1002N and graphics processor 1008.

In at least one embodiment, processor 1000 additionally includes graphics processor 1008 to execute graphics processing operations. In at least one embodiment, graphics processor 1008 couples with shared cache units 1006, and system agent core 1010, including one or more integrated memory controllers 1014. In at least one embodiment, system agent core 1010 also includes a display controller 1011 to drive graphics processor output to one or more coupled displays. In at least one embodiment, display controller 1011 may also be a separate module coupled with graphics processor 1008 via at least one interconnect, or may be integrated within graphics processor 1008.

In at least one embodiment, a ring based interconnect unit 1012 is used to couple internal components of processor 1000. In at least one embodiment, an alternative interconnect unit may be used, such as a point-to-point interconnect, a switched interconnect, or other techniques. In at least one embodiment, graphics processor 1008 couples with ring interconnect 1012 via an I/O link 1013.

In at least one embodiment, I/O link 1013 represents at least one of multiple varieties of I/O interconnects, including an on package I/O interconnect which facilitates communication between various processor components and a high-performance embedded memory module 1018, such as an eDRAM module. In at least one embodiment, each of processor cores 1002A-1002N and graphics processor 1008 use embedded memory modules 1018 as a shared Last Level Cache.

In at least one embodiment, processor cores 1002A-1002N are homogenous cores executing a common instruction set architecture. In at least one embodiment, processor cores 1002A-1002N are heterogeneous in terms of instruction set architecture (ISA), where one or more of processor cores 1002A-1002N execute a common instruction set, while one or more other cores of processor cores 1002A-1002N executes a subset of a common instruction set or a different instruction set. In at least one embodiment, processor cores 1002A-1002N are heterogeneous in terms of microarchitecture, where one or more cores having a relatively higher power consumption couple with one or more power cores having a lower power consumption. In at least one embodiment, processor 1000 may be implemented on one or more chips or as a SoC integrated circuit.

Inference and/or training logic 515 are used to perform inferencing and/or training operations associated with one or more embodiments. Details regarding inference and/or training logic 515 are provided below in conjunction with FIGS. 10A and/or 10B. In at least one embodiment portions or all of inference and/or training logic 515 may be incorporated into processor 1000. For example, in at least one embodiment, training and/or inferencing techniques described herein may use one or more of ALUs embodied in graphics processor 1008, graphics core(s) 1002A-1002N, or other components in FIG. 10. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 1000 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
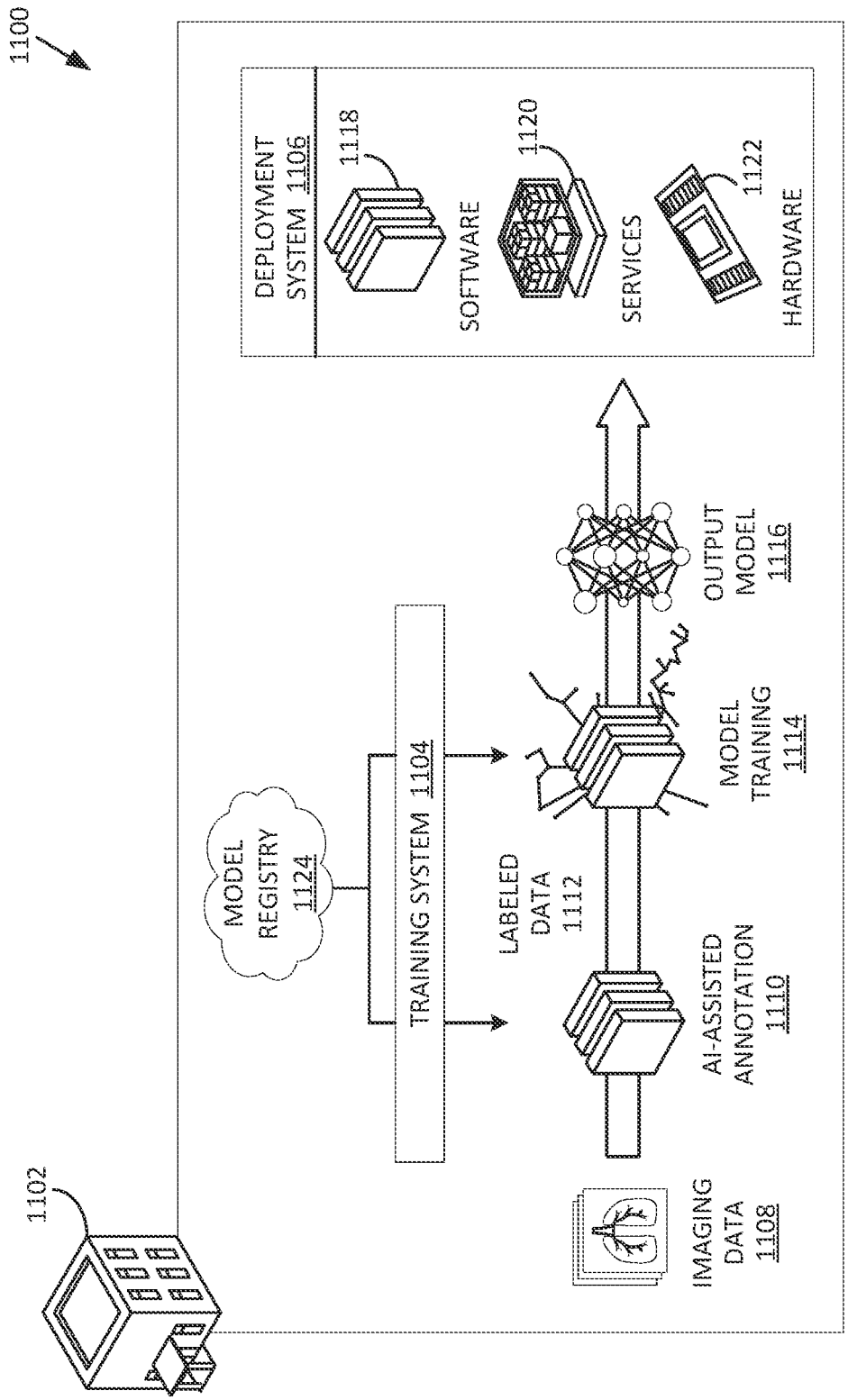
FIG. 11 is an example data flow diagram for an advanced computing pipeline, in accordance with at least one embodiment.

FIG. 11 is an example data flow diagram for a process 1100 of generating and deploying an image processing and inferencing pipeline, in accordance with at least one embodiment. In at least one embodiment, process 1100 may be deployed for use with imaging devices, processing devices, and/or other device types at one or more facilities 1102. Process 1100 may be executed within a training system 1104 and/or a deployment system 1106. In at least one embodiment, training system 1104 may be used to perform training, deployment, and implementation of machine learning models (e.g., neural networks, object detection algorithms, computer vision algorithms, etc.) for use in deployment system 1106. In at least one embodiment, deployment system 1106 may be configured to offload processing and compute resources among a distributed computing environment to reduce infrastructure requirements at facility 1102. In at least one embodiment, one or more applications in a pipeline may use or call upon services (e.g., inference, visualization, compute, AL, etc.) of deployment system 1106 during execution of applications.

In at least one embodiment, some of applications used in advanced processing and inferencing pipelines may use machine learning models or other AI to perform one or more processing steps. In at least one embodiment, machine learning models may be trained at facility 1102 using data 1108 (such as imaging data) generated at facility 1102 (and stored on one or more picture archiving and communication system (PACS) servers at facility 1102), may be trained using imaging or sequencing data 1108 from another facility (ies), or a combination thereof. In at least one embodiment, training system 1104 may be used to provide applications, services, and/or other resources for generating working, deployable machine learning models for deployment system 1106.

In at least one embodiment, model registry 1124 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1124 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1204 (FIG. 12) may include a scenario where facility 1102 is training their own machine learning model, or has an existing machine learning model that needs to be optimized or updated. In at least one embodiment, imaging data 1108 generated by imaging device(s), sequencing devices, and/or other device types may be received. In at least one embodiment, once imaging data 1108 is received, AI-assisted annotation 1110 may be used to aid in generating annotations corresponding to imaging data 1108 to be used as ground truth data for a machine learning model. In at least one embodiment, AI-assisted annotation 1110 may include one or more machine learning models (e.g., convolutional neural networks (CNNs)) that may be trained to generate annotations corresponding to certain types of imaging data 1108 (e.g., from certain devices). In at least one embodiment, AI-assisted annotations 1110 may then be used directly, or may be adjusted or fine-tuned using an annotation tool to generate ground truth data. In at least one embodiment, AI-assisted annotations 1110, labeled clinic data 1112, or a combination thereof may be used as ground truth data for training a machine learning model. In at least one embodiment, a trained machine learning model may be referred to as output model 1116, and may be used by deployment system 1106, as described herein.

In at least one embodiment, training pipeline 1204 (FIG. 12) may include a scenario where facility 1102 needs a machine learning model for use in performing one or more processing tasks for one or more applications in deployment system 1106, but facility 1102 may not currently have such a machine learning model (or may not have a model that is optimized, efficient, or effective for such purposes). In at least one embodiment, an existing machine learning model may be selected from a model registry 1124. In at least one embodiment, model registry 1124 may include machine learning models trained to perform a variety of different inference tasks on imaging data. In at least one embodiment, machine learning models in model registry 1124 may have been trained on imaging data from different facilities than facility 1102 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1124. In at least one embodiment, a machine learning model may then be retrained, or updated, at any number of other facilities, and a retrained or updated model may be made available in model registry 1124. In at least one embodiment, a machine learning model may then be selected from model registry 1124—and referred to as output model 1116—and may be used in deployment system 1106 to perform one or more processing tasks for one or more applications of a deployment system.

In at least one embodiment, training pipeline 1204 (FIG. 12), a scenario may include facility 1102 requiring a machine learning model for use in performing one or more processing tasks for one or more applications in deployment system 1106, but facility 1102 may not currently have such a machine learning model (or may not have a model that is optimized, efficient, or effective for such purposes). In at least one embodiment, a machine learning model selected from model registry 1124 may not be fine-tuned or optimized for imaging data 1108 generated at facility 1102 because of differences in populations, robustness of training data used to train a machine learning model, diversity in anomalies of training data, and/or other issues with training data. In at least one embodiment, AI-assisted annotation 1110 may be used to aid in generating annotations corresponding to imaging data 1108 to be used as ground truth data for retraining or updating a machine learning model. In at least one embodiment, labeled data 1112 may be used as ground truth data for training a machine learning model. In at least one embodiment, retraining or updating a machine learning model may be referred to as model training 1114. In at least one embodiment, model training 1114—e.g., AI-assisted annotations 1110, labeled clinic data 1112, or a combination thereof—may be used as ground truth data for retraining or updating a machine learning model. In at least one embodiment, a trained machine learning model may be referred to as output model 1116, and may be used by deployment system 1106, as described herein.

In at least one embodiment, deployment system 1106 may include software 1118, services 1120, hardware 1122, and/or other components, features, and functionality. In at least one embodiment, deployment system 1106 may include a software "stack," such that software 1118 may be built on top of services 1120 and may use services 1120 to perform some or all of processing tasks, and services 1120 and software 1118 may be built on top of hardware 1122 and use hardware 1122 to execute processing, storage, and/or other compute tasks of deployment system 1106. In at least one embodiment, software 1118 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1108, in addition to containers that receive and configure imaging data for use by each container and/or for use by facility 1102 after processing through a pipeline (e.g., to convert outputs back to a usable data type). In at least one embodiment, a combination of containers within software 1118 (e.g., that make up a pipeline) may be referred to as a virtual instrument (as described in more detail herein), and a virtual instrument may leverage services 1120 and hardware 1122 to execute some or all processing tasks of applications instantiated in containers.

In at least one embodiment, a data processing pipeline may receive input data (e.g., imaging data 1108) in a specific format in response to an inference request (e.g., a request from a user of deployment system 1106). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1116 of training system 1104.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1124 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1120 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1200 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1124. In at least one embodiment, a requesting entity—who provides an inference or image processing request—may browse a container registry and/or model registry 1124 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1106 (e.g., a cloud) to perform processing of data processing pipeline. In at least one embodiment, processing by deployment system 1106 may include referencing selected elements (e.g., applications, containers, models, etc.) from a container registry and/or model registry 1124. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1120 may be leveraged. In at least one embodiment, services 1120 may include compute services, artificial intelligence (AI) services, visualization services, and/or other service types. In at least one embodiment, services 1120 may provide functionality that is common to one or more applications in software 1118, so functionality may be abstracted to a service that may be called upon or leveraged by applications. In at least one embodiment, functionality provided by services 1120 may run dynamically and more efficiently, while also scaling well by allowing applications to process data in parallel (e.g., using a parallel computing platform 1230 (FIG. 12)). In at least one embodiment, rather than each application that shares a same functionality offered by a service 1120 being required to have a respective instance of service 1120, service 1120 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1120 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1118 implementing advanced processing and inferencing pipeline that includes segmentation application and anomaly detection application may be streamlined because each application may call upon a same inference service to perform one or more inferencing tasks.

In at least one embodiment, hardware 1122 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1122 may be used to provide efficient, purpose-built support for software 1118 and services 1120 in deployment system 1106. In at least one embodiment, use of GPU processing may be implemented for processing locally (e.g., at facility 1102), within an AI/deep learning system, in a cloud system, and/or in other processing components of deployment system 1106 to improve efficiency, accuracy, and efficacy of image processing and generation. In at least one embodiment, software 1118 and/or services 1120 may be optimized for GPU processing with respect to deep learning, machine learning, and/or high-performance computing, as non-limiting examples. In at least one embodiment, at least some of computing environment of deployment system 1106 and/or training system 1104 may be executed in a datacenter one or more supercomputers or high performance computing systems, with GPU optimized software (e.g., hardware and software combination of NVIDIA's DGX System). In at least one embodiment, hardware 1122 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 12 is a system diagram for an example system 1200 for generating and deploying an imaging deployment pipeline, in accordance with at least one embodiment. In at least one embodiment, system 1200 may be used to implement process 1100 of FIG. 11 and/or other processes including advanced processing and inferencing pipelines. In at least one embodiment, system 1200 may include training system 1104 and deployment system 1106. In at least one embodiment, training system 1104 and deployment system 1106 may be implemented using software 1118, services 1120, and/or hardware 1122, as described herein.

In at least one embodiment, system 1200 (e.g., training system 1104 and/or deployment system 1106) may implemented in a cloud computing environment (e.g., using cloud 1226). In at least one embodiment, system 1200 may be implemented locally with respect to a healthcare services facility, or as a combination of both cloud and local computing resources. In at least one embodiment, access to APIs in cloud 1226 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1200, may be restricted to a set of public IPs that have been vetted or authorized for interaction.

In at least one embodiment, various components of system 1200 may communicate between and among one another using any of a variety of different network types, including but not limited to local area networks (LANs) and/or wide area networks (WANs) via wired and/or wireless communication protocols. In at least one embodiment, communication between facilities and components of system 1200 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1104 may execute training pipelines 1204, similar to those described herein with respect to FIG. 11. In at least one embodiment, where one or more machine learning models are to be used in deployment pipelines 1210 by deployment system 1106, training pipelines 1204 may be used to train or retrain one or more (e.g. pre-trained) models, and/or implement one or more of pre-trained models 1206 (e.g., without a need for retraining or updating). In at least one embodiment, as a result of training pipelines 1204, output model(s) 1116 may be generated. In at least one embodiment, training pipelines 1204 may include any number of processing steps, such as but not limited to imaging data (or other input data) conversion or adaption In at least one embodiment, for different machine learning models used by deployment system 1106, different training pipelines 1204 may be used. In at least one embodiment, training pipeline 1204 similar to a first example described with respect to FIG. 11 may be used for a first machine learning model, training pipeline 1204 similar to a second example described with respect to FIG. 11 may be used for a second machine learning model, and training pipeline 1204 similar to a third example described with respect to FIG. 11 may be used for a third machine learning model. In at least one embodiment, any combination of tasks within training system 1104 may be used depending on what is required for each respective machine learning model. In at least one embodiment, one or more of machine learning models may already be trained and ready for deployment so machine learning models may not undergo any processing by training system 1104, and may be implemented by deployment system 1106.

In at least one embodiment, output model(s) 1116 and/or pre-trained model(s) 1206 may include any types of machine learning models depending on implementation or embodiment. In at least one embodiment, and without limitation, machine learning models used by system 1200 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 13A:
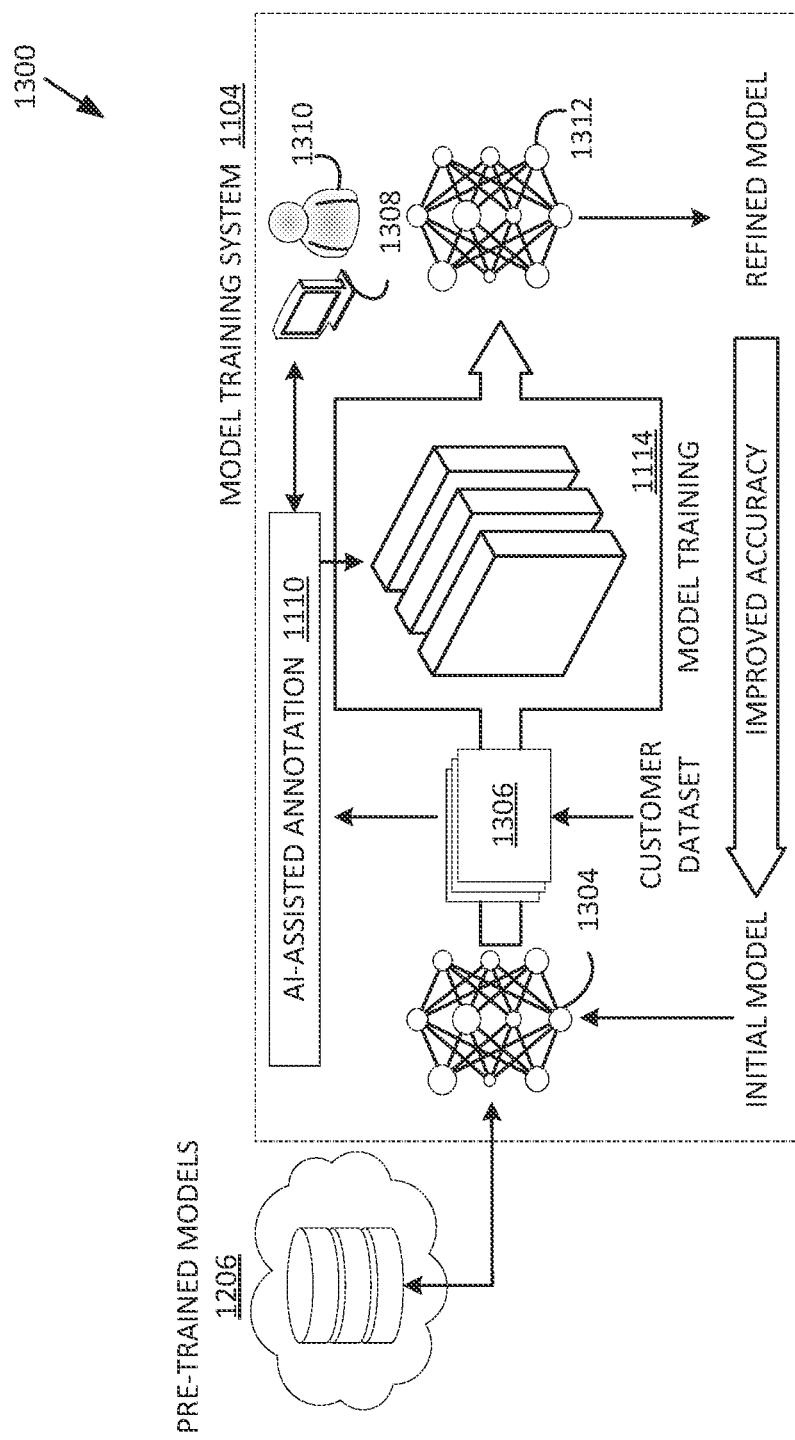
FIGS. 13A and 13B illustrate a data flow diagram for a process to train a machine learning model, as well as client-server architecture to enhance annotation tools with pre-trained annotation models, in accordance with at least one embodiment.
Figure 13B:
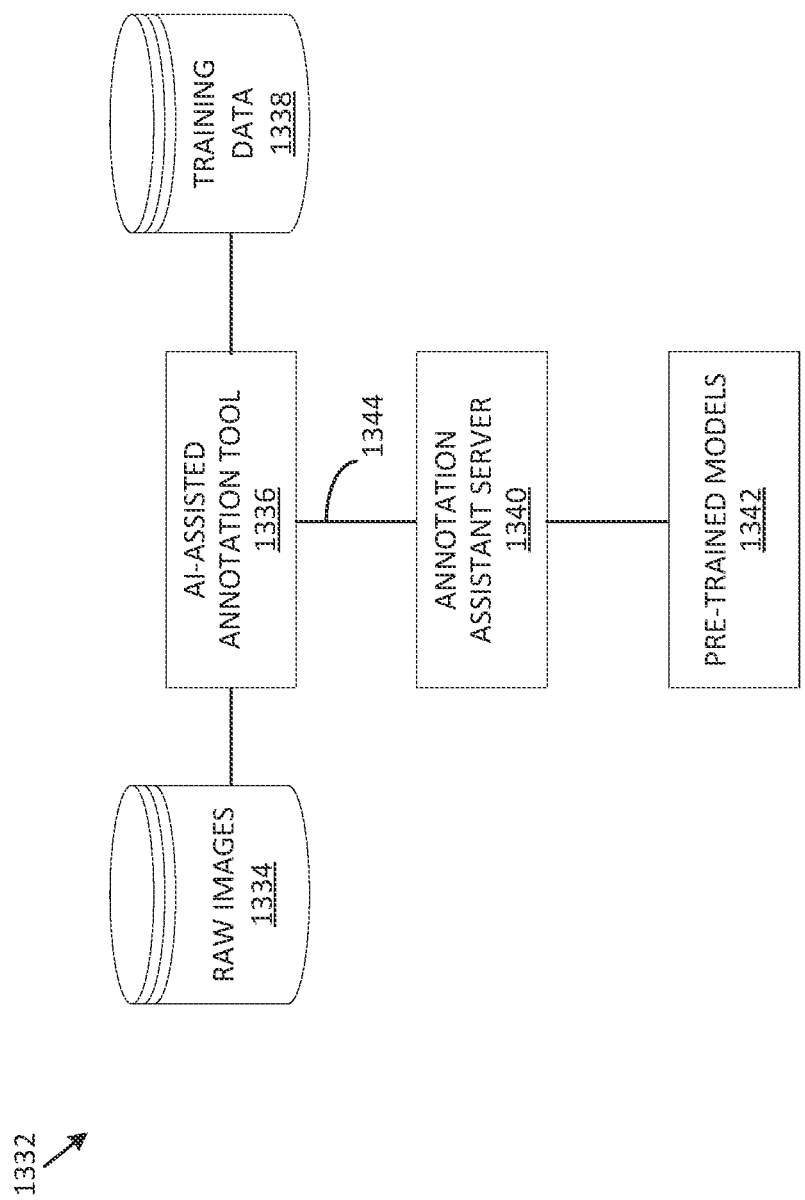

In at least one embodiment, training pipelines 1204 may include AI-assisted annotation, as described in more detail herein with respect to at least FIG. 13B. In at least one embodiment, labeled data 1112 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1108 (or other data type used by machine learning models), there may be corresponding ground truth data generated by training system 1104. In at least one embodiment, AI-assisted annotation may be performed as part of deployment pipelines 1210; either in addition to, or in lieu of AI-assisted annotation included in training pipelines 1204. In at least one embodiment, system 1200 may include a multi-layer platform that may include a software layer (e.g., software 1118) of diagnostic applications (or other application types) that may perform one or more medical imaging and diagnostic functions.

In at least one embodiment, system 1200 may be communicatively coupled to (e.g., via encrypted links) PACS server networks of one or more facilities. In at least one embodiment, system 1200 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1102). In at least one embodiment, applications may then call or execute one or more services 1120 for performing compute, AL, or visualization tasks associated with respective applications, and software 1118 and/or services 1120 may leverage hardware 1122 to perform processing tasks in an effective and efficient manner.

In at least one embodiment, deployment system 1106 may execute deployment pipelines 1210. In at least one embodiment, deployment pipelines 1210 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1210 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1210 depending on information desired from data generated by a device. In at least one embodiment, where detections of anomalies are desired from an MRI machine, there may be a first deployment pipeline 1210, and where image enhancement is desired from output of an MRI machine, there may be a second deployment pipeline 1210.

In at least one embodiment, an image generation application may include a processing task that includes use of a machine learning model. In at least one embodiment, a user may desire to use their own machine learning model, or to select a machine learning model from model registry 1124. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1200—such as services 1120 and hardware 1122—deployment pipelines 1210 may be even more user friendly, provide for easier integration, and produce more accurate, efficient, and timely results.

In at least one embodiment, deployment system 1106 may include a user interface 1214 (e.g., a graphical user interface, a web interface, etc.) that may be used to select applications for inclusion in deployment pipeline(s) 1210, arrange applications, modify, or change applications or parameters or constructs thereof, use and interact with deployment pipeline(s) 1210 during set-up and/or deployment, and/or to otherwise interact with deployment system 1106. In at least one embodiment, although not illustrated with respect to training system 1104, user interface 1214 (or a different user interface) may be used for selecting models for use in deployment system 1106, for selecting models for training, or retraining, in training system 1104, and/or for otherwise interacting with training system 1104.

In at least one embodiment, pipeline manager 1212 may be used, in addition to an application orchestration system 1228, to manage interaction between applications or containers of deployment pipeline(s) 1210 and services 1120 and/or hardware 1122. In at least one embodiment, pipeline manager 1212 may be configured to facilitate interactions from application to application, from application to service 1120, and/or from application or service to hardware 1122. In at least one embodiment, although illustrated as included in software 1118, this is not intended to be limiting, and in some examples (e.g., as illustrated in FIG. 10) pipeline manager 1212 may be included in services 1120. In at least one embodiment, application orchestration system 1228 (e.g., Kubernetes, DOCKER, etc.) may include a container orchestration system that may group applications into containers as logical units for coordination, management, scaling, and deployment. In at least one embodiment, by associating applications from deployment pipeline(s) 1210 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1212 and application orchestration system 1228. In at least one embodiment, so long as an expected input and/or output of each container or application is known by a system (e.g., based on constructs of applications or containers), application orchestration system 1228 and/or pipeline manager 1212 may facilitate communication among and between, and sharing of resources among and between, each of applications or containers. In at least one embodiment, because one or more of applications or containers in deployment pipeline(s) 1210 may share same services and resources, application orchestration system 1228 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1228) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1120 leveraged by and shared by applications or containers in deployment system 1106 may include compute services 1216, AI services 1218, visualization services 1220, and/or other service types. In at least one embodiment, applications may call (e.g., execute) one or more of services 1120 to perform processing operations for an application. In at least one embodiment, compute services 1216 may be leveraged by applications to perform super-computing or other high-performance computing (HPC) tasks. In at least one embodiment, compute service(s) 1216 may be leveraged to perform parallel processing (e.g., using a parallel computing platform 1230) for processing data through one or more of applications and/or one or more tasks of a single application, substantially simultaneously. In at least one embodiment, parallel computing platform 1230 (e.g., NVIDIA's CUDA) may enable general purpose computing on GPUs (GPGPU) (e.g., GPUs 1222). In at least one embodiment, a software layer of parallel computing platform 1230 may provide access to virtual instruction sets and parallel computational elements of GPUs, for execution of compute kernels. In at least one embodiment, parallel computing platform 1230 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1230 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1218 may be leveraged to perform inferencing services for executing machine learning model(s) associated with applications (e.g., tasked with performing one or more processing tasks of an application). In at least one embodiment, AI services 1218 may leverage AI system 1224 to execute machine learning model(s) (e.g., neural networks, such as CNNs) for segmentation, reconstruction, object detection, feature detection, classification, and/or other inferencing tasks. In at least one embodiment, applications of deployment pipeline(s) 1210 may use one or more of output models 1116 from training system 1104 and/or other models of applications to perform inference on imaging data. In at least one embodiment, two or more examples of inferencing using application orchestration system 1228 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1228 may distribute resources (e.g., services 1120 and/or hardware 1122) based on priority paths for different inferencing tasks of AI services 1218.

In at least one embodiment, shared storage may be mounted to AI services 1218 within system 1200. In at least one embodiment, shared storage may operate as a cache (or other storage device type) and may be used to process inference requests from applications. In at least one embodiment, when an inference request is submitted, a request may be received by a set of API instances of deployment system 1106, and one or more instances may be selected (e.g., for best fit, for load balancing, etc.) to process a request. In at least one embodiment, to process a request, a request may be entered into a database, a machine learning model may be located from model registry 1124 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1212) may be used to launch an application that is referenced in a request if an application is not already running or if there are not enough instances of an application. In at least one embodiment, if an inference server is not already launched to execute a model, an inference server may be launched.

Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)).

In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<13 min). In at least one embodiment, model execution times may be measured from requesting institution or entity and may include partner network traversal time, as well as execution on an inference service.

In at least one embodiment, transfer of requests between services 1120 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1226, and an inference service may perform inferencing on a GPU.

In at least one embodiment, visualization services 1220 may be leveraged to generate visualizations for viewing outputs of applications and/or deployment pipeline(s) 1210. In at least one embodiment, GPUs 1222 may be leveraged by visualization services 1220 to generate visualizations. In at least one embodiment, rendering effects, such as ray-tracing, may be implemented by visualization services 1220 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1220 may include an internal visualizer, cinematics, and/or other rendering or image processing capabilities or functionality (e.g., ray tracing, rasterization, internal optics, etc.).

In at least one embodiment, hardware 1122 may include GPUs 1222, AI system 1224, cloud 1226, and/or any other hardware used for executing training system 1104 and/or deployment system 1106. In at least one embodiment, GPUs 1222 (e.g., NVIDIA's TESLA and/or QUADRO GPUs) may include any number of GPUs that may be used for executing processing tasks of compute services 1216, AI services 1218, visualization services 1220, other services, and/or any of features or functionality of software 1118. For example, with respect to AI services 1218, GPUs 1222 may be used to perform pre-processing on imaging data (or other data types used by machine learning models), post-processing on outputs of machine learning models, and/or to perform inferencing (e.g., to execute machine learning models). In at least one embodiment, cloud 1226, AI system 1224, and/or other components of system 1200 may use GPUs 1222. In at least one embodiment, cloud 1226 may include a GPU-optimized platform for deep learning tasks. In at least one embodiment, AI system 1224 may use GPUs, and cloud 1226—or at least a portion tasked with deep learning or inferencing—may be executed using one or more AI systems 1224. As such, although hardware 1122 is illustrated as discrete components, this is not intended to be limiting, and any components of hardware 1122 may be combined with, or leveraged by, any other components of hardware 1122.

In at least one embodiment, AI system 1224 may include a purpose-built computing system (e.g., a super-computer or an HPC) configured for inferencing, deep learning, machine learning, and/or other artificial intelligence tasks. In at least one embodiment, AI system 1224 (e.g., NVIDIA's DGX) may include GPU-optimized software (e.g., a software stack) that may be executed using a plurality of GPUs 1222, in addition to DPUs, CPUs, RAM, storage, and/or other components, features, or functionality. In at least one embodiment, one or more AI systems 1224 may be implemented in cloud 1226 (e.g., in a data center) for performing some or all of AI-based processing tasks of system 1200.

In at least one embodiment, cloud 1226 may include a GPU-accelerated infrastructure (e.g., NVIDIA's NGC) that may provide a GPU-optimized platform for executing processing tasks of system 1200. In at least one embodiment, cloud 1226 may include an AI system(s) 1224 for performing one or more of AI-based tasks of system 1200 (e.g., as a hardware abstraction and scaling platform). In at least one embodiment, cloud 1226 may integrate with application orchestration system 1228 leveraging multiple GPUs to enable seamless scaling and load balancing between and among applications and services 1120. In at least one embodiment, cloud 1226 may tasked with executing at least some of services 1120 of system 1200, including compute services 1216, AI services 1218, and/or visualization services 1220, as described herein. In at least one embodiment, cloud 1226 may perform small and large batch inference (e.g., executing NVIDIA's TENSOR RT), provide an accelerated parallel computing API and platform 1230 (e.g., NVIDIA's CUDA), execute application orchestration system 1228 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1200.

FIG. 13A illustrates a data flow diagram for a process 1300 to train, retrain, or update a machine learning model, in accordance with at least one embodiment. In at least one embodiment, process 1300 may be executed using, as a non-limiting example, system 1200 of FIG. 12. In at least one embodiment, process 1300 may leverage services 1120 and/or hardware 1122 of system 1200, as described herein. In at least one embodiment, refined models 1312 generated by process 1300 may be executed by deployment system 1106 for one or more containerized applications in deployment pipelines 1210.

In at least one embodiment, model training 1114 may include retraining or updating an initial model 1304 (e.g., a pre-trained model) using new training data (e.g., new input data, such as customer dataset 1306, and/or new ground truth data associated with input data). In at least one embodiment, to retrain, or update, initial model 1304, output or loss layer(s) of initial model 1304 may be reset, or deleted, and/or replaced with an updated or new output or loss layer(s). In at least one embodiment, initial model 1304 may have previously fine-tuned parameters (e.g., weights and/or biases) that remain from prior training, so training or retraining 1114 may not take as long or require as much processing as training a model from scratch. In at least one embodiment, during model training 1114, by having reset or replaced output or loss layer(s) of initial model 1304, parameters may be updated and re-tuned for a new data set based on loss calculations associated with accuracy of output or loss layer(s) at generating predictions on new, customer dataset 1306 (e.g., image data 1108 of FIG. 11).

In at least one embodiment, pre-trained models 1206 may be stored in a data store, or registry (e.g., model registry 1124 of FIG. 11). In at least one embodiment, pre-trained models 1206 may have been trained, at least in part, at one or more facilities other than a facility executing process 1300. In at least one embodiment, to protect privacy and rights of patients, subjects, or clients of different facilities, pre-trained models 1206 may have been trained, on-premise, using customer or patient data generated on-premise. In at least one embodiment, pre-trained models 1206 may be trained using cloud 1226 and/or other hardware 1122, but confidential, privacy protected patient data may not be transferred to, used by, or accessible to any components of cloud 1226 (or other off premise hardware). In at least one embodiment, where a pre-trained model 1206 is trained at using patient data from more than one facility, pre-trained model 1206 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1206 on-premise and/or off premise, such as in a datacenter or other cloud computing infrastructure.

In at least one embodiment, when selecting applications for use in deployment pipelines 1210, a user may also select machine learning models to be used for specific applications. In at least one embodiment, a user may not have a model for use, so a user may select a pre-trained model 1206 to use with an application. In at least one embodiment, pre-trained model 1206 may not be optimized for generating accurate results on customer dataset 1306 of a facility of a user (e.g., based on patient diversity, demographics, types of medical imaging devices used, etc.). In at least one embodiment, prior to deploying pre-trained model 1206 into deployment pipeline 1210 for use with an application(s), pre-trained model 1206 may be updated, retrained, and/or fine-tuned for use at a respective facility.

In at least one embodiment, a user may select pre-trained model 1206 that is to be updated, retrained, and/or fine-tuned, and pre-trained model 1206 may be referred to as initial model 1304 for training system 1104 within process 1300. In at least one embodiment, customer dataset 1306 (e.g., imaging data, genomics data, sequencing data, or other data types generated by devices at a facility) may be used to perform model training 1114 (which may include, without limitation, transfer learning) on initial model 1304 to generate refined model 1312. In at least one embodiment, ground truth data corresponding to customer dataset 1306 may be generated by training system 1104. In at least one embodiment, ground truth data may be generated, at least in part, by clinicians, scientists, doctors, practitioners, at a facility (e.g., as labeled clinic data 1112 of FIG. 11).

In at least one embodiment, AI-assisted annotation 1110 may be used in some examples to generate ground truth data. In at least one embodiment, AI-assisted annotation 1110 (e.g., implemented using an AI-assisted annotation SDK) may leverage machine learning models (e.g., neural networks) to generate suggested or predicted ground truth data for a customer dataset. In at least one embodiment, user 1310 may use annotation tools within a user interface (a graphical user interface (GUI)) on computing device 1308.

In at least one embodiment, user 1310 may interact with a GUI via computing device 1308 to edit or fine-tune (auto) annotations. In at least one embodiment, a polygon editing feature may be used to move vertices of a polygon to more accurate or fine-tuned locations.

In at least one embodiment, once customer dataset 1306 has associated ground truth data, ground truth data (e.g., from AI-assisted annotation, manual labeling, etc.) may be used by during model training 1114 to generate refined model 1312. In at least one embodiment, customer dataset 1306 may be applied to initial model 1304 any number of times, and ground truth data may be used to update parameters of initial model 1304 until an acceptable level of accuracy is attained for refined model 1312. In at least one embodiment, once refined model 1312 is generated, refined model 1312 may be deployed within one or more deployment pipelines 1210 at a facility for performing one or more processing tasks with respect to medical imaging data.

In at least one embodiment, refined model 1312 may be uploaded to pre-trained models 1206 in model registry 1124 to be selected by another facility. In at least one embodiment, his process may be completed at any number of facilities such that refined model 1312 may be further refined on new datasets any number of times to generate a more universal model.

FIG. 13B is an example illustration of a client-server architecture 1332 to enhance annotation tools with pre-trained annotation models, in accordance with at least one embodiment. In at least one embodiment, AI-assisted annotation tools 1336 may be instantiated based on a client-server architecture 1332. In at least one embodiment, annotation tools 1336 in imaging applications may aid radiologists, for example, identify organs and abnormalities. In at least one embodiment, imaging applications may include software tools that help user 1310 to identify, as a non-limiting example, a few extreme points on a particular organ of interest in raw images 1334 (e.g., in a 3D MRI or CT scan) and receive auto-annotated results for all 2D slices of a particular organ. In at least one embodiment, results may be stored in a data store as training data 1338 and used as (for example and without limitation) ground truth data for training. In at least one embodiment, when computing device 1308 sends extreme points for AI-assisted annotation 1110, a deep learning model, for example, may receive this data as input and return inference results of a segmented organ or abnormality. In at least one embodiment, pre-instantiated annotation tools, such as AI-Assisted Annotation Tool 1336B in FIG. 13B, may be enhanced by making API calls (e.g., API Call 1344) to a server, such as an Annotation Assistant Server 1340 that may include a set of pre-trained models 1342 stored in an annotation model registry, for example. In at least one embodiment, an annotation model registry may store pre-trained models 1342 (e.g., machine learning models, such as deep learning models) that are pre-trained to perform AI-assisted annotation on a particular organ or abnormality. These models may be further updated by using training pipelines 1204. In at least one embodiment, pre-installed annotation tools may be improved over time as new labeled clinic data 1112 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    obtaining one or more performance metrics corresponding to a receiver receiving frames of an application via a network, wherein the one or more performance metrics include information indicative of a current occupancy of a frame buffer of the receiver and information indicative of a target occupancy of the frame buffer of the receiver;
    adjusting, based at least on the information indicative of the current occupancy of the frame buffer of the receiver and the information indicative of the target occupancy of the frame buffer of the receiver, a frame rate associated with rendering at least one next frame of the application to be displayed by the receiver;
    rendering the at least one next frame using the frame rate; and
    upon rendering the at least one next frame, sending, using the network, the at least one next frame to the receiver to be displayed.

2. The method of claim 1, wherein the information indicative of the target occupancy of the frame buffer is determined using at least one of: a first duration of time associated with a network jitter of the network or a second duration of time associated with a frame buffer.

3. The method of claim 2, wherein the first duration of time associated with the network jitter of the network is determined using a difference between an expected arrival time of the frames by the receiver and an actual arrival time of the frames by the receiver.

4. The method of claim 2, wherein the second duration of time associated with the frame buffer is a period of time the frames remained on a frame buffer of the receiver before presentation.

5. The method of claim 1, wherein adjusting the frame rate associated with rendering the at least one next frame of the application to be displayed by the receiver comprises:
    responsive to determining that the information indicative of the current occupancy of the frame buffer exceeds the information indicative of the target occupancy of the frame buffer, decreasing the frame rate associated with rendering the at least one next frame to decrease the current occupancy of the frame buffer to match the target occupancy of the frame buffer.

6. The method of claim 5, wherein decreasing the frame rate associated with rendering the at least one next frame comprises:
    increasing a delay applied to at least one of: an execution stage of a plurality of execution stages associated with rendering the at least one next frame or prior to a first execution stage of the plurality of execution stages associated with rendering the at least one next frame.

7. The method of claim 1, wherein adjusting the frame rate associated with rendering the at least one next frame comprises:
    responsive to determining that the information indicative of the current occupancy of the frame buffer does not exceed the information indicative of the target occupancy of the frame buffer, increasing the frame rate associated with rendering the at least one next frame to increase the current occupancy of the frame buffer to match the target occupancy of the frame buffer.

8. The method of claim 7, wherein increasing the frame rate associated with rendering the at least one next frame comprises:
    decreasing at least one of: a delay applied to an execution stage of a plurality of execution stages associated with rendering the at least one next frame, or a delay applied prior to a first execution stage of the plurality of execution stages associated with rendering the at least one next frame.

9. The method of claim 1, wherein adjusting the frame rate associated with the rendering at least one next frame of the application comprises using a proportional-integral-derivative (PID) controller that dynamically adjusts the frame rate associated with the rendering of the at least one next fame based on the one or more performance metrics of the receiver.

10. The method of claim 1, wherein adjusting the frame rate associated with the rendering at least one next frame of the application comprises:
    providing the one or more performance metrics corresponding to the receiver as input to a trained machine learning model; and
    obtaining an output of the trained machine learning model, the output indicating the frame rate associated with the rendering of the at least one next fame.

11. The method of claim 10, wherein the trained machine learning model is trained using training data that comprises, for each of a plurality of prior user sessions, one or more of recorded network statistics, recorded occupancy of the frame buffer of the receiver, recorded frame rate associated with frame rendering, or recorded number of missed frames.

12. The method of claim 1, further comprising:
    prior to adjusting, the frame rate associated with rendering the at least one next frame of the application to be displayed by the receiver, determining, based on a current frame rate and the one or more performance metrics corresponding to the receiver, whether to enable the adjusting of the frame rate associated with the rendering of the at least one next frame; and
    responsive to determining to enable the adjusting of the frame rate associated with the rendering of the at least one next frame, enabling the adjusting of the frame rate associated with the rendering of the at least one next frame.

13. A system comprising:
one or more processing units to:
  obtain one or more performance metrics corresponding to a receiver receiving frames of an application via a network, wherein the one or more performance metrics include information indicative of a current occupancy of a frame buffer corresponding to the receiver and information indicative of a target occupancy of the frame buffer corresponding to the receiver;
  adjust, using at least on the information indicative of the current occupancy of the frame buffer of the receiver and the information indicative of the target occupancy of the frame buffer of the receiver, a frame rate associated with rendering at least one next frame of the application to be displayed by the receiver;
  render the at least one next frame using the frame rate; and
  upon rendering the at least one next frame, send, using the network, the at least one next frame to the receiver to be displayed.

14. The system of claim 13, wherein to adjust the frame rate, the one or more processing units are further to:
  responsive to determining that the information indicative of the current occupancy of the frame buffer exceeds the information indicative of the target occupancy of the frame buffer, decrease the frame rate associated with rendering the at least one next frame to decrease the current occupancy of the frame buffer to match the target occupancy of the frame buffer.

15. The system of claim 14, wherein to decrease the frame rate associated with rendering the at least one next frame, the one or more processing units further:
  increase at least one of: a delay applied an execution stage of a plurality of execution stages associated with rendering the at least one next frame, or a delay applied prior to a first execution stage of the plurality of execution stages associated with rendering the at least one next frame.

16. The system of claim 13, wherein to adjust the frame rate, the one or more processing units are further to:
  responsive to determining that the information indicative of the current occupancy of the frame buffer does not exceed the information indicative of the target occupancy of the frame buffer, increase the frame rate associated with rendering the at least one next frame to increase the current occupancy of the frame buffer to match the target occupancy of the frame buffer.

17. The system of claim 13, wherein to increase the frame rate associated with rendering the at least one next frame, the one or more processing units are further to:
  decrease at least one of: a delay applied to an execution stage of a plurality of execution stages associated with rendering the at least one next frame, or a delay applied prior to a first execution stage of the plurality of execution stages associated with rendering the at least one next frame.

18. A non-transitory computer-readable storage medium comprising instructions that, when executed by a processing device, cause the processing device to perform operations comprising:
  receiving, using a network, a frame of an application from a server, the frame rendered using a first frame rate;
  determining one or more performance metrics associated with the frame, wherein the one or more performance metrics include information indicative of a current occupancy of a frame buffer and information indicative of a target occupancy of the frame buffer;
  sending, to the server, the information indicative of the current occupancy of the frame buffer of the receiver and the information indicative of the target occupancy of the frame buffer of the receiver to determine a second frame rate associated with rendering of a next frame of the application; and
  receiving, using the network, the next frame rendered using the second frame rate.

19. The non-transitory computer-readable storage medium of claim 18, wherein the information indicative of the target occupancy of the frame buffer is determined using at least one of: a first duration of time associated with a network jitter of the network or a second duration of time associated with a frame buffer.

20. The non-transitory computer-readable storage medium of claim 19, wherein the first duration of time associated with the network jitter of the network is determined using a difference between an expected arrival time of the frames by the receiver and an actual arrival time of the frames by the receiver.

21. The non-transitory computer-readable storage medium of claim 19, wherein the second duration of time associated with the frame buffer is a period of time the frames remained on a frame buffer of the receiver before presentation.

* * * * *